US012588751B2

(12) United States Patent
Smith

(10) Patent No.: US 12,588,751 B2
(45) Date of Patent: Mar. 31, 2026

(54) VEHICLE WASHING SYSTEM AND METHOD

(71) Applicant: Jud Smith, Greencastle, IN (US)

(72) Inventor: Judson Smith, Greencastle, IN (US)

(73) Assignee: SMITH INTELLECTUAL PROPERTY, LLC, Greencastle, IN (US)

( * ) Notice: Subject to any disclaimer, the term of this patent is extended or adjusted under 35 U.S.C. 154(b) by 541 days.

(21) Appl. No.: 17/950,407

(22) Filed: Sep. 22, 2022

(65) Prior Publication Data

US 2023/0022443 A1     Jan. 26, 2023

Related U.S. Application Data

(63) Continuation-in-part of application No. 17/845,227, filed on Jun. 21, 2022, now abandoned, which is a
(Continued)

(51) Int. Cl.
B60S 3/06        (2006.01)
A46B 3/08        (2006.01)
(Continued)

(52) U.S. Cl.
CPC .............. *A46D 1/0261* (2013.01); *A46B 3/08* (2013.01); *A46B 7/026* (2013.01); *A46B 9/06* (2013.01);
(Continued)

(58) Field of Classification Search
CPC .. B60S 3/06; A46B 9/02; A46B 17/06; A46D 1/0207
See application file for complete search history.

(56) References Cited

U.S. PATENT DOCUMENTS 26,403  A     12/1859  Adams
120,791  A     11/1871  Spellman
(Continued)

FOREIGN PATENT DOCUMENTS

CN        101695434        4/2010
DE          20104007        6/2001
(Continued)

*Primary Examiner* — Michael D Jennings
(74) *Attorney, Agent, or Firm* — Woodard, Emhardt, Henry, Reeves & Wagner, LLP

(57)                ABSTRACT

Washing devices comprise an integrally formed brush component including a hub having a central axis and a plurality of bristles. Each bristle includes a shaft extending from the hub and having outwardly extending cleaning structures. The bristles extend radially from the central axis of the hub. A cylindrical support comprises a webbing having an array of holes positioned to receive the bristles of the brush component, each of the bristles being received within and extending outwardly from respective holes in the webbing. Alternate embodiments comprise an integrally-formed, linear brush component including a plurality of connected hub elements, each hub element carrying a bristle. Each bristle includes an elongated shaft having multiple cleaning structures extending outwardly. A webbing comprises an array of holes positioned to receive the bristles of the linear brush component, each of the bristles being received within and extending outwardly from respective holes in the webbing.

10 Claims, 26 Drawing Sheets

Related U.S. Application Data continuation of application No. 17/591,041, filed on Feb. 2, 2022, now Pat. No. 12,161,219.

(60) Provisional application No. 63/274,186, filed on Nov. 1, 2021, provisional application No. 63/212,873, filed on Jun. 21, 2021, provisional application No. 63/145,667, filed on Feb. 4, 2021, provisional application No. 63/145,230, filed on Feb. 3, 2021.

(51) Int. Cl.

| | |
|---|---|
| *A46B 7/02* | (2006.01) |
| *A46B 9/06* | (2006.01) |
| *A46B 9/10* | (2006.01) |
| *A46D 1/00* | (2006.01) |
| *B60S 3/04* | (2006.01) |

(52) U.S. Cl.
CPC .............. *A46B 9/10* (2013.01); *A46D 1/0238* (2013.01); *A46B 2200/3046* (2013.01); *B60S 3/045* (2013.01); *B60S 3/063* (2013.01)

(56) References Cited

U.S. PATENT DOCUMENTS

| | | | |
|---|---|---|---|
| 564,497 A | 7/1896 | Babis | |
| 684,203 A | 10/1901 | Eaton | |
| 1,298,096 A | 3/1919 | Roberts | |
| 1,803,086 A | 4/1931 | Allen | |
| 1,824,994 A | 9/1931 | Herold et al. | |
| 1,908,788 A | 5/1933 | Pulliam | |
| 2,215,692 A | 9/1940 | Fleming | |
| 2,644,181 A | 7/1953 | Lazarus et al. | |
| 2,754,531 A | 7/1956 | Rowland | |
| 2,773,275 A | 12/1956 | Peterson | |
| 2,807,820 A | 10/1957 | Dinhofer | |
| 2,825,080 A | 3/1958 | Bongiovanni | |
| 3,089,168 A | 5/1963 | Blanford | |
| 3,237,232 A | 3/1966 | Holley | |
| 3,393,418 A | 7/1968 | Mundo | |
| 3,487,490 A | 1/1970 | Wuster | |
| 3,683,441 A | 8/1972 | Fromme | |
| 3,693,206 A | 9/1972 | Tatara et al. | |
| 3,698,405 A | 10/1972 | Walker | |
| 3,705,435 A | 12/1972 | Von Kulmer | |
| 3,761,986 A | 10/1973 | Rickel | |
| 3,909,868 A | 10/1975 | Nogues | |
| 3,914,818 A | 10/1975 | Fromme | |
| 4,096,600 A | 6/1978 | Belanger | |
| 4,166,302 A | 9/1979 | Kim | |
| 4,276,674 A | 7/1981 | Hunt | |
| 4,320,551 A | 3/1982 | Roncaglione | |
| 4,373,541 A | 2/1983 | Nishioka | |
| 4,417,826 A | 11/1983 | Floros | |
| 4,510,639 A | 4/1985 | Roncaglione | |
| 4,567,620 A | 2/1986 | Hanna | |
| 4,670,929 A | 6/1987 | Hanna | |
| 4,756,040 A | 7/1988 | Sereny | |
| 4,876,157 A | 10/1989 | Barman | |
| 5,058,231 A | 10/1991 | Lowe | |
| 5,134,742 A * | 8/1992 | Ennis ..................... B60S 3/063 | |
| | | | 15/53.1 |
| 5,177,825 A | 1/1993 | Belanger et al. | |
| 5,358,311 A | 10/1994 | Drumm | |
| 5,461,745 A | 10/1995 | Nittoli | |
| 5,511,274 A | 4/1996 | Lewis | |
| 5,623,741 A | 4/1997 | Gaylord | |
| 5,669,981 A | 9/1997 | Stinnett et al. | |
| 5,687,446 A | 11/1997 | Chen et al. | |
| 5,709,002 A | 1/1998 | Belanger et al. | |
| 5,813,076 A | 9/1998 | Belanger et al. | |
| 5,903,951 A | 5/1999 | Ionta et al. | |
| 5,951,113 A | 9/1999 | Lewis | |
| 6,202,279 B1 | 3/2001 | Belanger et al. | |
| 6,391,445 B1 | 5/2002 | Weihrauch | |
| 6,564,418 B1 | 5/2003 | Favagrossa | |
| 6,631,831 B1 * | 10/2003 | Loiselle ................. A46B 17/06 | |
| | | | 222/272 |
| 6,725,492 B2 | 4/2004 | Moore et al. | |
| 7,017,223 B2 | 3/2006 | Clark | |
| 7,096,598 B1 * | 8/2006 | Myatt ................... A45D 20/52 | |
| | | | 34/96 |
| 7,219,385 B1 | 5/2007 | Rietsch | |
| 7,310,849 B2 * | 12/2007 | White ................. A46B 5/0025 | |
| | | | 15/186 |
| 7,805,798 B2 | 10/2010 | Belanger | |
| 8,024,995 B2 | 9/2011 | Dayton et al. | |
| 9,067,655 B1 | 6/2015 | Fusco | |
| 9,326,591 B2 | 5/2016 | Nicoline | |
| 9,802,582 B2 | 10/2017 | Favagrossa | |
| 10,369,973 B2 | 8/2019 | Belanger et al. | |
| 10,517,388 B2 | 12/2019 | Perez et al. | |
| 10,549,728 B1 | 2/2020 | Fitzsimmons | |
| 10,702,057 B2 | 7/2020 | Xi et al. | |
| 10,717,419 B2 | 7/2020 | Belanger et al. | |
| 10,750,851 B2 * | 8/2020 | Mikitovic ............... A46B 1/00 | |
| 2002/0065031 A1 | 5/2002 | Chou et al. | |
| 2002/0132572 A1 | 9/2002 | Lageson et al. | |
| 2002/0184722 A1 | 12/2002 | Kaady et al. | |
| 2004/0010878 A1 | 1/2004 | Levesque | |
| 2004/0112400 A1 | 6/2004 | Kurek | |
| 2005/0172431 A1 | 8/2005 | Kohlruss et al. | |
| 2005/0268413 A1 | 12/2005 | Pecora | |
| 2006/0080799 A1 | 4/2006 | Lucente | |
| 2006/0088711 A1 * | 4/2006 | Nakamura ........... A46D 1/0276 | |
| | | | 15/207.2 |
| 2007/0193597 A1 | 8/2007 | Hurwitz | |
| 2008/0083421 A1 | 4/2008 | Malvar et al. | |
| 2008/0250594 A1 | 10/2008 | Green | |
| 2009/0217944 A1 | 9/2009 | Munera et al. | |
| 2009/0250993 A1 | 10/2009 | Vivyan et al. | |
| 2010/0031459 A1 | 2/2010 | Holbus | |
| 2010/0192991 A1 | 8/2010 | Belanger et al. | |
| 2011/0225757 A1 * | 9/2011 | Kuo ........................ A46B 3/16 | |
| | | | 15/186 |
| 2011/0289717 A1 | 12/2011 | Dhanvanthari | |
| 2013/0104332 A1 | 5/2013 | Belanger et al. | |
| 2014/0366290 A1 * | 12/2014 | Belanger ................... B60S 3/06 | |
| | | | 15/53.1 |
| 2015/0047136 A1 | 2/2015 | Bernardi Pirini | |
| 2015/0128366 A1 * | 5/2015 | Kim ....................... A46B 9/023 | |
| | | | 15/160 |
| 2015/0182013 A1 * | 7/2015 | Yao .................... A46B 15/0051 | |
| | | | 132/120 |
| 2015/0210252 A1 | 7/2015 | Belanger et al. | |
| 2015/0282602 A1 * | 10/2015 | Elias ..................... A45D 20/52 | |
| | | | 206/581 |
| 2016/0311408 A1 | 10/2016 | Belanger et al. | |
| 2017/0311711 A1 | 11/2017 | Sorrentino | |
| 2018/0317640 A1 | 11/2018 | Holding | |
| 2019/0045912 A1 | 2/2019 | Mikitovic et al. | |
| 2019/0104912 A1 | 4/2019 | Amicon | |
| 2019/0176771 A1 | 6/2019 | Belanger | |
| 2019/0246778 A1 | 8/2019 | Holding | |
| 2019/0281971 A1 | 9/2019 | Perez et al. | |
| 2020/0000214 A1 * | 1/2020 | Casey ..................... A46B 5/02 | |
| 2020/0298805 A1 | 9/2020 | Fitzsimmons | |
| 2021/0179034 A1 | 6/2021 | Yamin, Sr. et al. | |

FOREIGN PATENT DOCUMENTS

| | | |
|---|---|---|
| DE | 20106592 | 7/2001 |
| DE | 102011007326 | 10/2012 |
| EP | 2517603 | 10/2012 |
| EP | 2 959 799 | 5/2017 |
| KR | 20080004107 | 9/2008 |
| KR | 101903289 B1 * | 10/2012 |
| KR | 101190774 B1 * | 10/2018 |
| KR | 10-2158951 | 9/2020 |
| WO | WO 90/01281 | 2/1990 |

(56)        References Cited

FOREIGN PATENT DOCUMENTS

WO      WO 1990001281  A2      2/1990
WO      WO 2020/164242          8/2020
WO      WO 2020/197789        10/2020

* cited by examiner

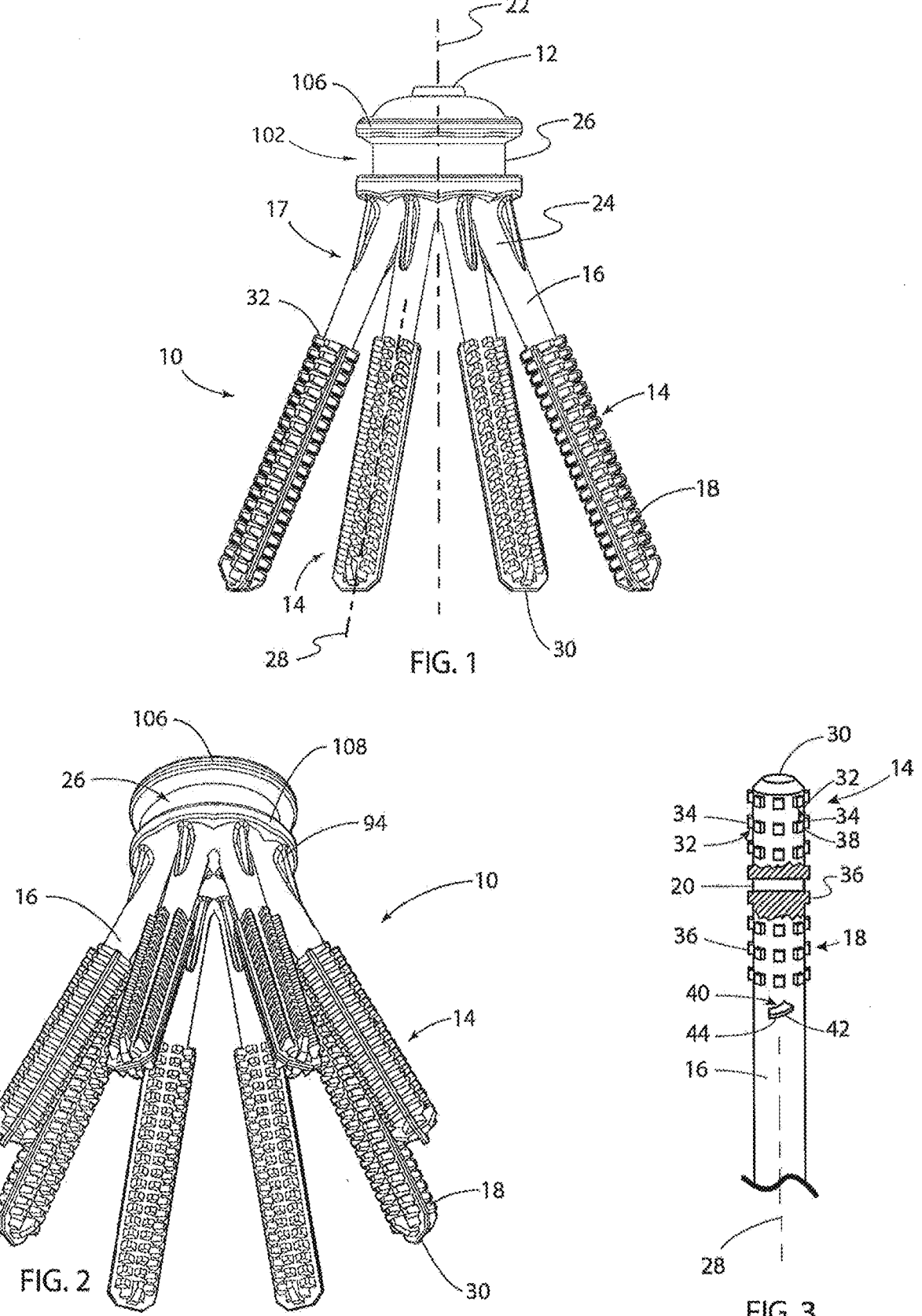

VEHICLE WASHING SYSTEM AND METHOD

FIELD OF THE INVENTION

This invention relates to the design, manufacture and use of cleaning brushes and more particularly bristle brushes including a hub and several outwardly extending bristles. In a particular aspect, the brushes are injection molded and include bristles having projecting cleaning structures presenting multiple cleaning edges. The brushes may comprise an assembly of separate components, or may be formed as integral, one-piece units. In one aspect, the brushes are produced by folding a planar brush precursor to reposition the bristles relative to the hub. The brushes may include integral structures for facilitating attachment to a support structure. The brushes are well suited for use in cleaning a variety of surfaces, and have a particular application in the washing and cleaning of vehicles.

This invention further relates to devices, systems and methods relating to the washing of vehicles. The devices include elongated stanchions which hang vertically and contain brushes which bear against the vehicle as it is washed. In embodiments, the stanchions support wavelike brush carriers to which the brushes are mounted. In particular embodiments, the brush carriers include apertures in which the brushes are received. Ancillary components may also be included. The systems and methods include the manipulation of the stanchions to move the stanchions relative to the washing vehicle.

BACKGROUND OF THE DISCLOSURE

The present invention relates to washing devices and systems useful for use with a variety of objects and surfaces. In one application, the present invention relates to apparatus, systems and methods for washing vehicles. This invention relates to the design, manufacture and use of cleaning brushes and more particularly bristle brushes. In a particular aspect, the brushes are integrally molded in a planar form including a hub and multiple bristles, and the brushes are wrapped with a webbing to form a cylindrical washing device in which the bristles extend radially outward from holes in the webbing.

The art is well known relative to automatic car washing using rotating brushes and hang-down mitting curtains, which collectively have become the preferred industry standard equipment for automatically washing vehicles. It is apparent from the prior art that a continuing objective in this field is the development of brush arrangements which achieve improved cleaning.

It has always been difficult for automatic car washes to use rotating bristle type brushes to properly and safely wash a car. This is because vehicle shapes, sizes, and types of exterior painted surfaces and their coatings represent extraordinary challenges for automatic car washing equipment employing rotating brushes. In order to achieve the proper tip speed and contact of rotating bristle brush tips, the brushes must be gentle and soft, and be able to closely follow and penetrate the intricate contours of the various types of vehicles. If the rotating brushes do not operate in a precise manner, vehicle damage can result.

Additionally, the prior art relating to hang-down mitting curtains is also extensive, relating to both the mechanical movement of mitting curtains for improved agitating type washing actions, and the material and design configurations of the curtains to provide better vehicle washing of the irregularities of vehicle surfaces.

Although advancements in automatic car washing equipment have been significant over the years, there still remain many problem areas that need improvement. These problem areas include vehicle damage caused by rotating brushes; overuse of water and chemicals by the rotating brushes flinging solution caused by the centrifugal action of the rotating brushes; parts of the vehicle remaining uncleaned due to missing washing actions caused by rotating brushes rotating in only. This disclosure effectively addresses these problem areas with novel improvements that will be readily apparent through the reading and understanding of the following summary and description of the invention.

SUMMARY OF THE DISCLOSURE

This disclosure relates to the design, production and use of brushes comprising a hub and multiple, outwardly-extending bristles. The brushes in embodiments include several bristles which extend equiradially from a hub at an acute angle to the central axis of the hub. The bristles include a large number of nubs which extend from the shaft of the bristle. The disclosure includes brushes formed as an assembly of components, or as an integrated, optionally molded, one-piece unit. In an embodiment, the brushes are formed by molding the hub and bristles in a planar form and then folding the bristles to their final position. The brushes include structures configured for mounting to an external support. The disclosure further describes methods of making the brushes, brushing apparatus including the brushes, and systems using the brushing apparatus.

The present invention in one aspect is directed to a brush comprising a hub and a plurality of bristles attached thereto, each bristle including an elongated shaft extending from a proximal end to a distal tip, and each bristle having the proximal end attached to the hub. The bristles extend from the hub at an acute angle to the central axis of the hub, and each bristle has an array of multiple cleaning structures extending outwardly from the shaft. In embodiments, the hub and/or the bristles form an annular recess or other structure which receives a variety of support structures.

In another aspect, the brushes are formed from a molded brush precursor. The brush precursor provides a cylindrical hub and bristles in a first position in which each of the bristles extends radially, preferably equiradially, from the hub in a plane orthogonal to the central axis of the hub. The hub and bristles have a second position in which the bristles extend at an acute angle relative to the central axis of the hub. In a method of making a brush, the hub and bristles are formed integrally with the bristles extending coplanar with the hub, and the brush is formed by folding the bristles from the first position to the second position. The bristles are then locked in the second position. In one embodiment, the hub and/or bristles form an annular recess and a locking component is received within the recess. The locking component may comprise, for example, a ring-shaped locking collar, or it may include a webbing including an aperture which receives the annular recess of the brush which is inserted while in the second position.

The brushes are useful in a variety of applications. The brushes may be received within differing types of support structures adapted for particular uses. For example, the support structure may simply be a locking collar received by the annular recess. A number of alternative support structures and applications are disclosed herein, although these are not to be taken as limiting.

In a particular application, an array of a number of the brushes is mounted to vertically-extending, flexible stanchions. These stanchions are arranged adjacent one another, and are moved vertically to function as a washing system for vehicles. In this application, an object of the invention is to provide a soft bristle brush arrangement for the washing of vehicles, particularly one that is vehicle-friendly and which eliminates the conventional rotating of the brushes for cleaning.

The stanchion-mounted bristle brush assemblies are moved against the vehicle's exterior surfaces. The stanchion movements include vibratory oscillation; up-and-down scrubbing; in-and-out scrubbing; and side-to-side scrubbing. These all constitute vehicle-friendly movements replicating much the same as a person would perform when carefully washing a vehicle with a soft cloth wash mitt or brush. The described washing movements using multiple soft flexible bristle brushes are also worker-friendly, because they do not include rotating type brushes.

Another preferred aspect of the disclosure is a bristle brush having integral attachment means that securely fastens the brush to a material such as a composited stanchion without requiring any additional hardware. In general, the brushes may comprise any common locking feature such as those using complementary shapes providing a form, press or snap fit.

A further aspect of the disclosed brushes is an injection molded, multiple bristle brush as described herein produced as a single part that does not require additional manufacturing or processing for its assembly or installation as a brush, representing a significant cost savings with injection molded bristle brush manufacturing. The brushes do not require tufting, stapling, fusing, bonding, channeling, or crimping that are common sub-assembly types of manufacturing processes associated with other forms of multi-step bristle brush manufacturing.

This disclosure also applies to devices, systems and methods for washing vehicles which do not require the previously-described brushes. The inventive washing devices comprise stanchions which include wavelike brush carriers which may be used with a variety of brushes, including but not limited to the unique brushes disclosed herein. The wavelike brush carriers support cleaning brushes and position them in a variety of positions, and at a variety of angles, to facilitate efficient and effective cleaning of vehicles. Spray nozzle, lights, and other ancillary components may also be provided.

In another aspect, the present invention provides a vehicle washing device comprising a brush component mounted within a cylindrical support. The brush component includes a hub and a plurality of bristles extending outwardly therefrom. The bristles include multiple cleaning structures extending outwardly of the bristle shaft. The bristles extend radially from the central axis of the cylindrical support.

The foregoing and other uses, features and advantages of the present invention will be apparent from the following more detailed description of the particular embodiments of the invention, as illustrated in the accompanying drawings.

BRIEF DESCRIPTION OF THE DRAWINGS

FIG. 1 is a side, elevational view of a Formed Brush in accordance with an embodiment of the present invention.

FIG. 2 is a perspective view of the Formed Brush of FIG. 1.

FIG. 3 is a partial, perspective side view of the distal end portion of an embodiment of a bristle with exemplary cleaning structures useful in the brushes disclosed herein.

DETAILED DESCRIPTION OF THE DISCLOSURE

Figures 4, 5, 6, 7, 8, 9, 10:
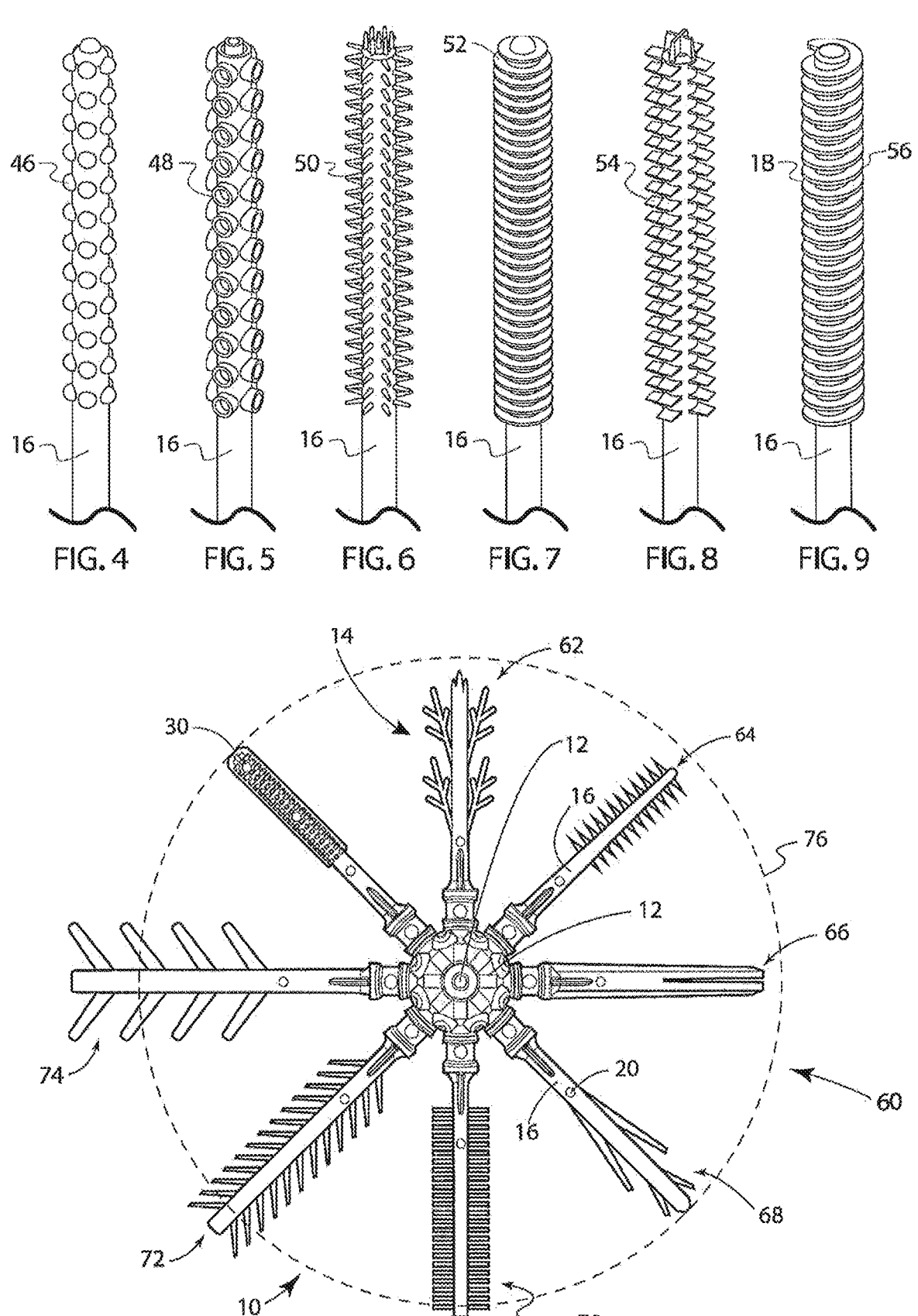
FIG. 4 is a perspective, side view of the distal end portion of an alternate embodiment of a bristle showing cleaning structures comprising rounded nubs.
FIG. 5 is a perspective, side view of the distal end portion of an alternate embodiment of a bristle showing cleaning structures comprising cup-shaped cleaning nubs.
FIG. 6 is a perspective, side view of the distal end portion of an alternate embodiment of a bristle showing cleaning structures comprising needle-type nubs.
FIG. 7 is a perspective, side view of the distal end portion of an alternate embodiment of a bristle showing cleaning structures comprising wafer-type cleaning nubs.
FIG. 8 is a perspective, side view of the distal end portion of an alternate embodiment of a bristle showing cleaning structures comprising pad-type cleaning nubs.
FIG. 9 is a perspective, side view of the distal end portion of an alternate embodiment of a bristle showing cleaning structures comprising a corkscrew nub.
FIG. 10 is a plan view showing additional alternate embodiments of bristles useful in the disclosed brushes.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Disclosed herein are brushes providing uniquely advantageous cleaning of surfaces. The bristles of the disclosed brushes have circumferential cleaning edges which provide high-resolution surface cleaning using less water, less chemicals, less energy, and without causing damage. The brushes comprise a number of bristles including shafts extending outwardly from a hub. A variety of cleaning structures are positioned on the shafts. The brushes are secured to support structures for moving the brushes against surfaces to be cleaned. The brushes in certain embodiments are particularly adapted for use in the cleaning of vehicles in an automated vehicle washing system.

Brushes

The present invention in one aspect comprises a brush including a hub and a plurality of bristles attached thereto. Each bristle includes an elongated shaft extending from a proximal end to a distal tip. Each bristle has the proximal end attached to the hub. The bristles extend from the hub at an acute angle to a central axis of the hub. Each bristle has an array of multiple cleaning structures extending outwardly from the shaft. The hub and/or the bristles may form a locking structure, such as an annular recess configured to be received within a complementary component, such as a locking collar or an aperture in a support structure.

Brush Components

Referring to FIGS. 1-3, there is shown an embodiment of a brush 10 of the present disclosure. Brush 10 includes a hub 12 and several bristles 14 extending from hub 12. The bristles preferably extend in a radial direction from the hub. Each bristle comprises a shaft 16 attached at a proximal end 17 to hub 12, and carrying a number of cleaning structures 18 which may have varying numbers, shapes and locations. Bristles 14 may also contain through holes 20 spaced along shaft 16.

In an embodiment, hub 12 includes a central axis 22, and shafts 16 extend parallel to or at an angle to central axis 22. In an embodiment, the bristles extend at an outward, acute angle of no more than 45°, preferably 15°-35°. The bristles may be positioned symmetrically or asymmetrically about central axis 22. Wedge-shaped gussets 24 may be provided to strengthen the positioning of the shafts. A locking structure 26, shown as an annular recess, may be provided to facilitate attachment of hub 12 to a support structure.

Bristles

In accordance with the present invention, a bristle 14 comprises a shaft 16 carrying a variety of cleaning structures 18. The term "shaft" refers to an elongated member which is generally linear in shape and may include a central axis 28 and a distal tip 30. The bristles may be straight, curved, angled or combinations thereof.

The shaft of each bristle includes a proximal end 17 secured to the hub. The shaft may extend from the hub at a range of angles, and a variety of such angles may be used for a given brush. The angles are selected based on the intended use of the brush. The angle(s) are also selected to ensure that the bristles are positioned to move effectively relative to nearby bristles. Typically, the bristle shafts will extend at an angle in the range of 0° to 45°, preferably 15° to 35°, relative to the central axis 22 of the hub.

The shaft is formed from a durable material which is suitably pliant and resilient for holding the cleaning components adjacent a surface to be cleaned. The shaft may have any cross section that provides the desired strength and flexibility. For example, the cross section may be an irregular or regular shape, and it may vary along the length of the shaft. A "regular" cross section refers to one which comprises a cross section that has the shape of a regular polygon. Preferred cross-sectional shapes include round, oval, square, pentagonal, hexagonal, octagonal, etc. In embodiments, the shaft has a number of lengthwise surfaces, for example eight in the case of an octagonal shaft, and cleaning structures may extend from each of these surfaces. The shafts may also include through holes 20, shown in FIGS. 1-2, which allow for fluid flow therethrough.

Cleaning Structures

The shafts of the bristles support a number of cleaning structures 18 extending outwardly therefrom. In embodiments, cleaning structures 18 are preferably formed integrally with the shaft, as by extrusion molding. The variety and number of such cleaning structures are selected based on the composition of the bristles and the intended use of the brush. Examples of cleaning structures are shown throughout the figures.

Nubs

One form of a cleaning structure is referred to herein as a "nub". The term "nub" refers to a relatively small diameter projection extending from the shaft with a size and position to contact a surface to be cleaned. Referring to FIG. 3, numerous nubs 32 are shown. Nubs 32 have side walls 34 extending from shaft 16 and terminating in end surfaces 36. In embodiments, the nubs extend normal to the surface of the shaft. However, nubs 32 may also extend at other angles relative to the shaft.

Nubs thereby present several surfaces for contacting and cleaning a surface, including the side wall surfaces 34 and the end surfaces 36. The junction between side walls 34 and end surfaces 36 may be smooth or rough. In one aspect, the junction between a side wall 34 and an end surface 36 is rounded, and in another aspect the junction provides a corner edge 38 which may further enhance the cleaning action of the nub.

The bristles have multiple nubs attached to each shaft. The number of nubs on a shaft may vary depending on the size of the brush, the use of the brush, and the cleaning effect desired. In embodiments, a bristle includes at least 10, at least 50, or even at least 100 nubs. The nubs may be arranged in patterns or may be irregularly positioned on the shaft. The number, shape and arrangement of the nubs may differ for different portions of a bristle. In one embodiment, the total number of individual nubs 32 per bristle 14 is approximately 120, with cleaning edges per bristle of approximately 960. In such an embodiment there are approximately 7,680 cleaning edges per brush.

Shaft Tips

Shafts 16 terminate in end portions or tips 30 which may have a variety of shapes. Shaft tips 30 thereby provide another form of a cleaning structure 18. The shaft tip may have any of a variety of shapes adapted to enhance the cleaning action of the bristle, and may include other cleaning structures as described herein. The end portion of the bristle may be pointed, rounded, or have a flat or irregular surface. Shaft tip 30 thereby provides a cleaning surface positioned to contact a surface to be cleaned.

Wiper Blades

Shaft 16 may also support one or more wiper blades 40. The term wiper blade refers to a component extending from the shaft in a position to act in the manner of a scraper of the surface to be cleaned. Along with the nubs, the wiper blades provide excellent cleaning, and help in retaining the chemical solution during the washing process. Referring to FIG. 3, wiper blade 40 comprises a wall-like structure which includes side walls 42 extending outwardly from shaft 16 and terminating in a contact surface 44. Contact surface 44 may be positioned such that the nubs extend outwardly from the shaft either more, the same, or less, than contact surfaces 44 of wiper blades 40. The positions of the contact surfaces of the wiper blades relative to end surfaces 36 of nubs 32 may vary within the same bristle.

In embodiments, the bristles include more than one wiper blade, preferably two or more wiper blades, located along the shaft. The contact surfaces of the wiper blades may be variously oriented relative to the longitudinal axis of the shaft. For example, the contact surface of a wiper blade may be parallel to or angled from longitudinal axis 28 of shaft 16. The wiper blades of a bristle may vary in number and in position along the length of the shaft. Also, the wiper blades may be located adjacent to or nested within the nubs, or may be located spaced from the nubs.

Other Cleaning Structures

The cleaning structures 18 may further comprise a wide variety of other regularly or irregularly shaped structures. Referring to FIGS. 4-9, there are shown a number of different cleaning structures located on shafts 16. FIG. 4 is a perspective view of a bristle having rounded nubs 46. FIG. 5 is a perspective view of an embodiment of a bristle structure having flexible tentacle-type, cup-shaped cleaning nubs 48. FIG. 6 is a perspective view of an embodiment of a bristle structure having flexible needle-type cleaning nubs 50. FIG. 7 is a perspective view of an embodiment of a bristle structure having flexible wafer-type cleaning nubs 52. FIG. 8 is a perspective view of an embodiment of a bristle structure having flexible, pad-type cleaning nubs 54. FIG. 9 is a perspective view of an embodiment of a bristle structure having flexible, corkscrew-type nub 56.

FIG. 10 further represents the capabilities of injection molding uniquely designed bristles. FIG. 10 is a plan view of bristles having a variety of additional types of cleaning structures. Shown in FIG. 10 is a brush 60 having eight different types of bristles with different diameters, lengths, nubs, wiper blades, etc. For example, FIG. 10 depicts bristles having such structures as a tree branch shape 62, a coarse comb 64, a forked wiper blade 66, a tapered branch 68, a dense comb 70, fine tapered fins 72, and coarse tapered fins 74, all integrally connected. The varying lengths of the individual bristles are shown by comparison to radius 76.

Brush Materials

The components of the brushes may be formed from a variety of suitable materials. In a preferred embodiment, thermoplastic media and/or thermoset media are used. These materials have a generally rubbery, soft touch and feel, are highly flexible and shock absorbing, are chemically resistant, are resistant to Ozone, have high elasticity, and can be recycled. Materials such as low-density polyethylene (LDPE), high density polyethylene (HDPE), and reinforced PVC, to name a few, also provide excellent composited brush structures. Examples of materials also include any and all polymer alloys, such as thermoplastic polyurethane (TPU), thermoplastic elastomers (TPE), thermoplastic vulcanizate (TPV), and silicone elastomer (Polysiloxane).

The parts of the brush may need some stiffness and or "extra" strength in the hub area for some designs. This may be obtained from "two shot molding", which involves sequential injection of a hard polymer followed by an over-molding of a soft polymer. This brings the mixed physical properties together in one part. This may also be done with insert molding where a previously molded part is inserted into an open mold and when the mold is closed a different polymer is shot over or around the inserted part giving the two-tone effect of different properties. This adds strength and durability to a soft exterior part by providing a hard, internal part via molding.

An example of a good quality co-polymer thermoplastic media bristle brush as described herein is formed from injected molded TPV produced by ExxonMobil Chemical Company and having the following properties:

a specific gravity of approximately 0.930;

an approximate density of 0.930 g/cm3;

an approximate 35-45 shore A hardness;

a compression set of approximately 8-10% (23° C.);

an elongation at break of approximately 350%-450% (23° C.);

a tensile strength at break of approximately 420-580 psi (23° C.); and a tensile stress at break of approximately 420-580 psi (23° C.).

The TPV has excellent wear characteristics and has many superior abrasion resistant qualities including that it is: highly flexible; naturally hydrophobic; self-cleaning; non-marking; highly resistant to chemicals; polyolefin based; and recyclable within the manufacturing process. The injection molding process has a fast injection rate with rear, middle, and front processing temperatures of approximately 350° to 400° F.; mold temperature of approximately 75°-125° F.; nozzle temperature of approximately 365°-410° F.; processing melt temperature of approximately 290°-420° F.; screw speed of approximately 100-200 RPM's, and a screw compression ratio of approximately 2.0:1 to 2.5:1. Clamp tonnage is approximately 3.0 to 5.0 tons/in$^2$.

Brush Production

The brushes of the present disclosure may be formed in various manners. In one approach, the brush components are formed separately and then combined. In another approach, at least some of the brush components are formed as integral units. In a preferred embodiment, all of the brush components are formed as an integral unit. As used herein, the term "integral" refers to the components comprising a single, unitary structure, such as obtained by injection molding or 3D additive manufacturing.

The brushes in one embodiment are produced by assembling separate components, or by molding the brushes as integral components. In this respect, the brushes may be referred to as "Formed Brushes".

Folded Brushes

Figure 11:
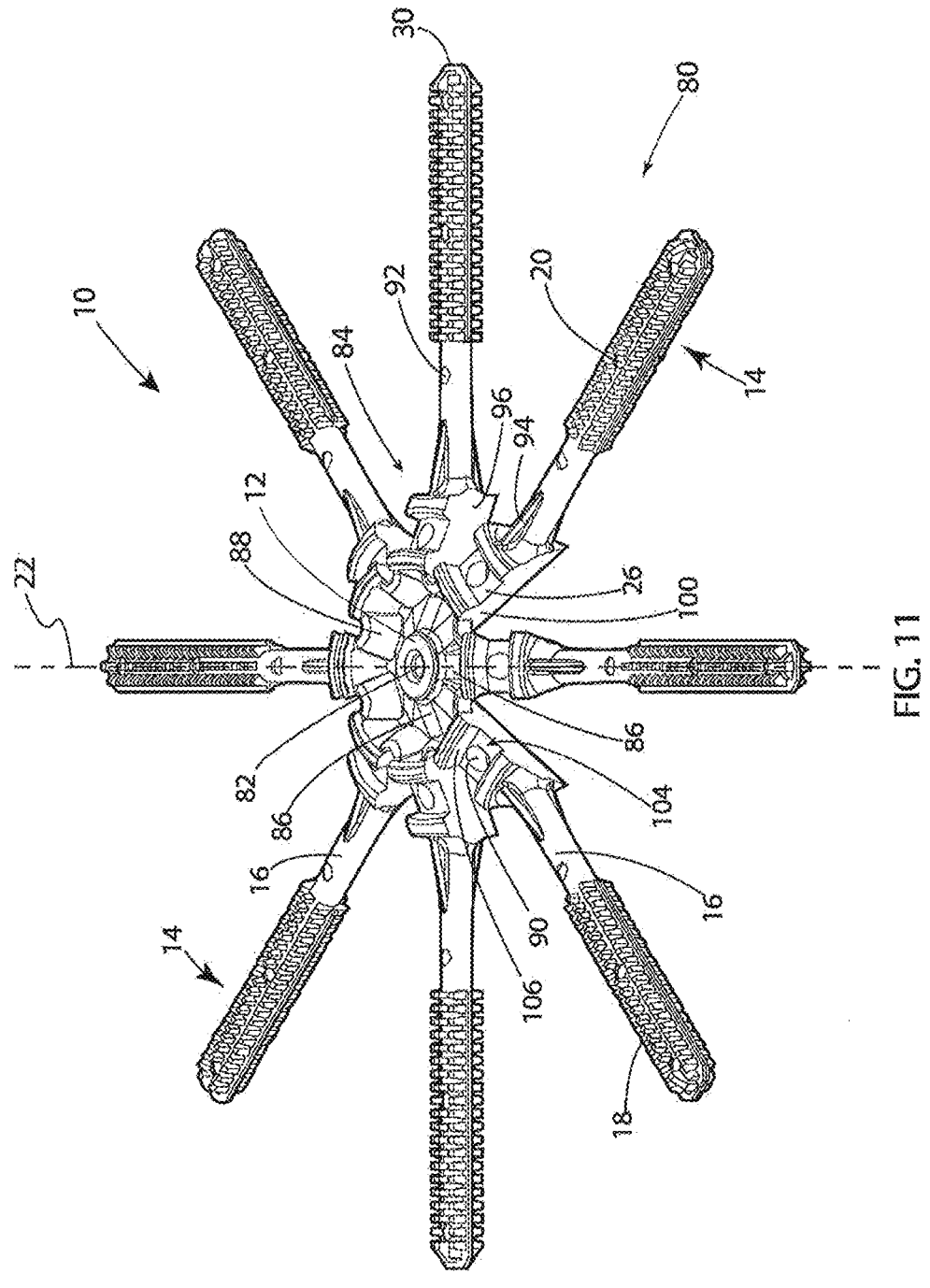
FIG. 11 is a perspective view of the exterior side of a brush precursor in accordance with the present invention, with the bristles in a first position relative to the hub.

In embodiments, the brushes are formed from a brush precursor 80. The brush precursor includes a hub and bristles which are integrally formed in a generally planar shape, as shown in FIG. 11. The brushes are formed by folding the bristles of the brush precursor relative to the hub. Brushes produced by folding a brush precursor may be referred to herein as "Folded Brushes". The brush precursor may include any or all of the same components as the previously described brushes, and the corresponding components are identified using like numbering. Unless indicated otherwise, features of the present invention may be applied to either Formed Brushes or Folded Brushes.

In a particular aspect, the hub and bristles of the brush are injection molded to form the brush precursor. The bristles are then repositioned relative to the hub to provide the bristles at the desired angle(s) to the hub. The brush precursor initially has the bristles in a first position relative to the hub, in which, for example, the bristles are oriented relative to the central axis of the hub to facilitate injection molding of the bristles in unison with the hub. To facilitate molding, the hub may have a planar configuration and the bristles are formed in a first position extending in a coplanar fashion with the hub. That is, the attachments of the bristle shafts define a plane with the hub, and the bristles extend in the plane orthogonal to the central axis of the hub.

The bristles are then moved to a second position extending at an angle to the central axis of the hub. For example, in a preferred embodiment the bristles are folded relative to the hub to form a brush having the bristles in the second position. In the second position, the bristles may extend parallel to or at an angle to the central axis of the hub. The resulting Folded Brush may comprise any of the features associated with a Formed Brush, and vice versa. For example, a Formed Brush and a Folded Brush may both have a "squid-like" appearance with the bristles extending at an acute angle of not more than 45°, such as 15° to 35°, relative to the central axis of the hub. For this reason, the brushes of the present invention are also sometimes collectively referred to as the SQUID™ brushes.

FIG. 11 shows a perspective view of the exterior side of a brush precursor 80 as obtained from a mold. This is the side which will form the exterior of the brush when the bristles are folded together. The hub and bristles are shown in FIG. 11 in a first, unfolded position in which the bristles extend radially from the hub in a plane orthogonal to the central axis of the hub. The brush may include any number of bristles which are preferably, but not necessarily, positioned equiradially.

Hub 12 is cylindrical in shape and has a central axis 22. The center of the hub may be solid (FIG. 10), or may include a central aperture 82 (FIG. 11), which may be used, for example, to receive fluid tubing or nozzles. A plurality of bristles 14 include elongated shafts 16 which carry multiple cleaning structures and extend from a proximal end 84 to the distal tip 30. The proximal ends 84 of the bristles 14 are attached to the hub by radially-spaced connectors 86. Connectors 86 define intervening open spaces 87 which facilitate the folding of the bristles relative to the hub. The bristles are attached by radially arch-shaped webbing 88 which secures adjacent bristles, but which is flexible and further allows for folding of the bristles.

Figure 12:
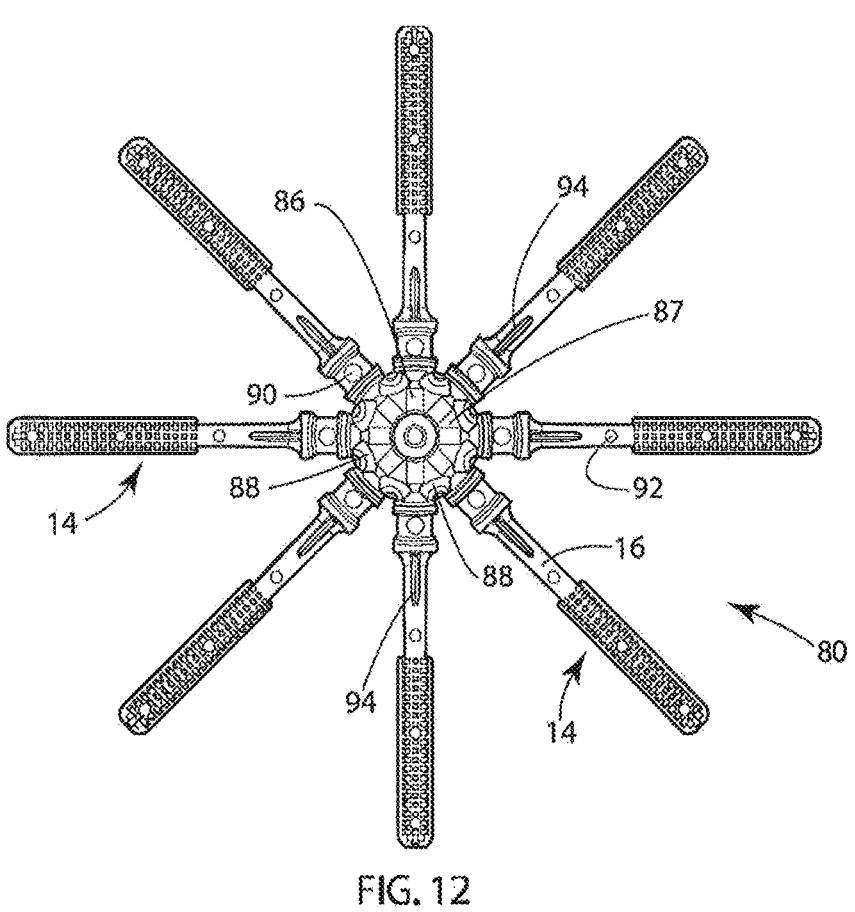
FIG. 12 is a plan view of the exterior side of the brush precursor of FIG. 11.
Figure 13:
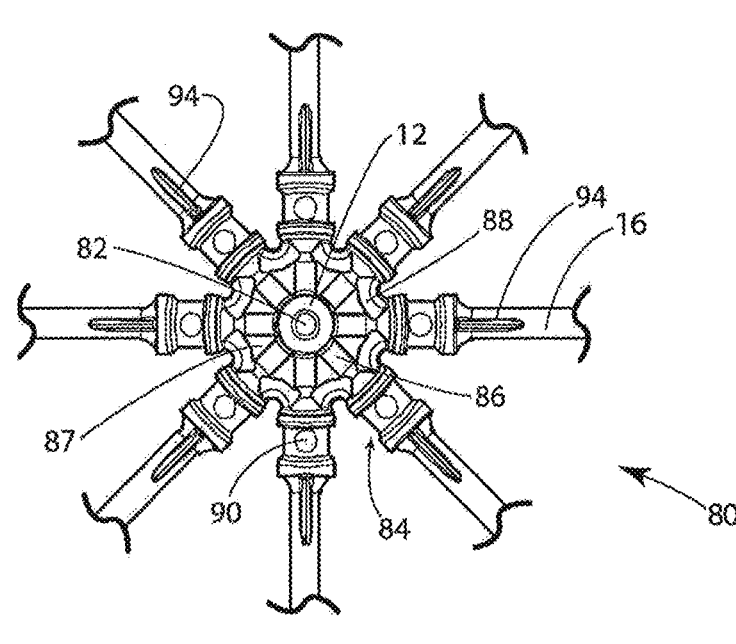
FIG. 13 is a partial, enlarged plan view of the central portion of the exterior side of the brush precursor of FIG. 12, showing the hub and proximal ends of the bristles.

The brush precursor 80 is preferably molded as a single, integral unit. As shown in FIG. 12, the brush precursor includes molding ejection pin locations 90 and 92 on each bristle. Having a significant number of combined mold ejector pin locations 90 and 92 provides for exceptionally fast and precise production output of the planar brush precursors. The ejector pin areas are purposely positioned on the same horizontal plane as the bristle's wiper blade 40. The core of the hub has an increased molded material thickness area for added structural strength in supporting the bristles. Also visible in FIGS. 11-12 are braces 94, which strengthen the support of the bristles.

Figure 14:
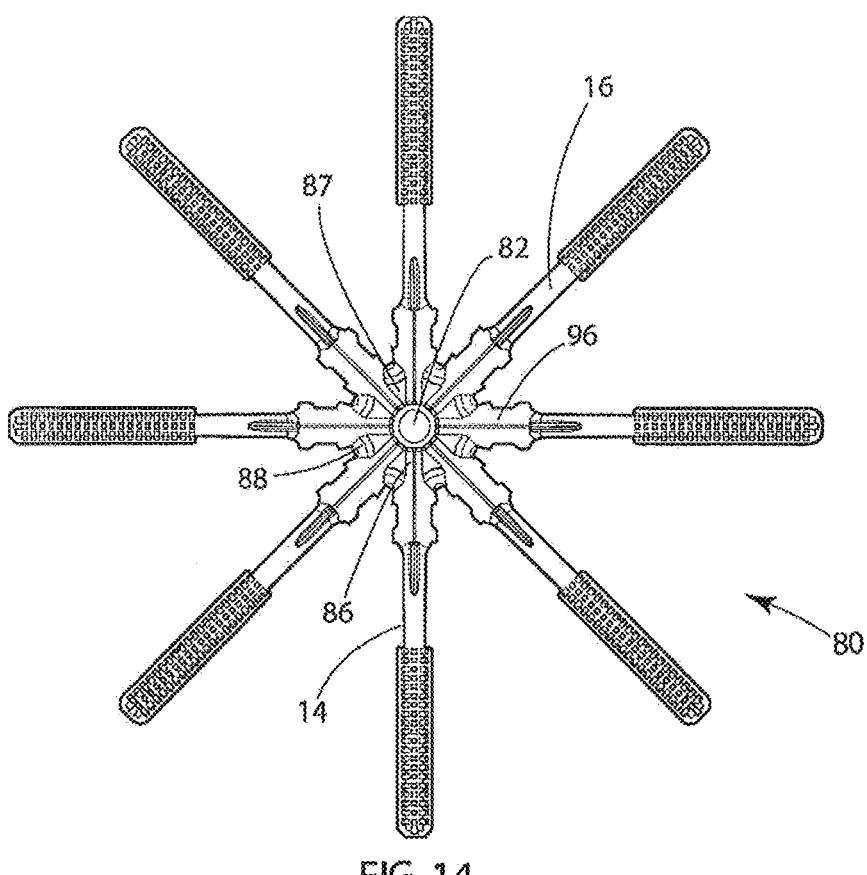
FIG. 14 is a plan view of the interior side of the brush precursor of FIG. 11.
Figure 15:
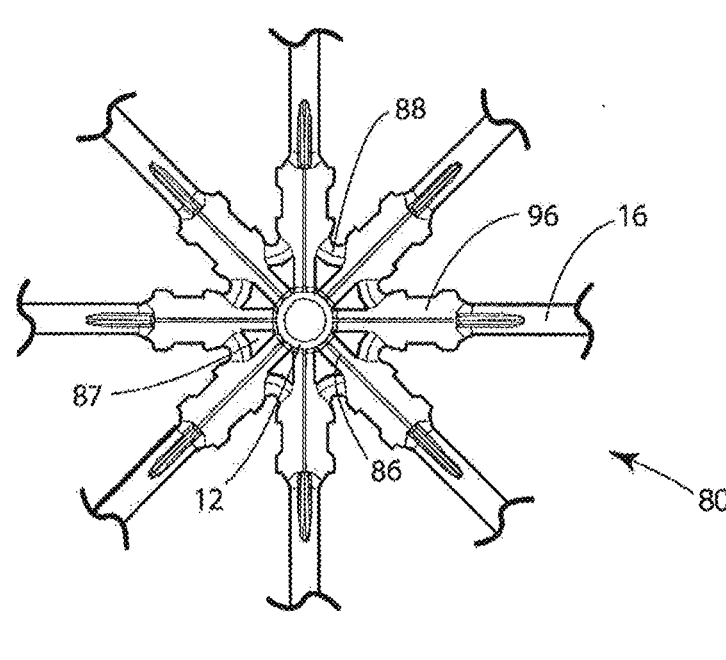
FIG. 15 is a partial, enlarged plan view of the central portion of the interior side of the brush precursor of FIG. 14, showing the hub and proximal ends of the bristles.
Figure 16:
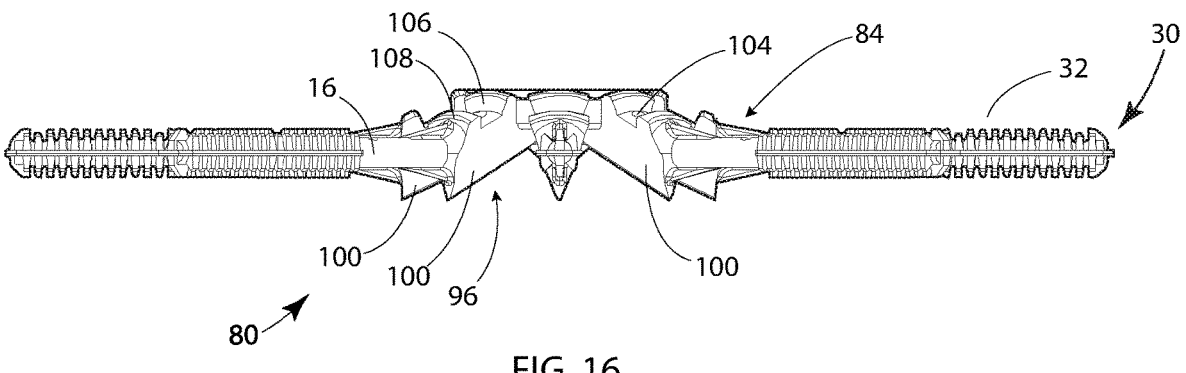
FIG. 16 is a side, elevational view of the brush precursor of FIG. 11.

FIGS. 14-15 show plan views of the interior side of the brush precursor with the bristles in the first position. FIG. 16 is a side, elevational view of the brush precursor with the bristles in the first position. These views show wedge-shaped gussets 96. The gussets are configured to facilitate formation and support of a brush formed from the brush precursor, as hereafter described.

Figures 17, 18:
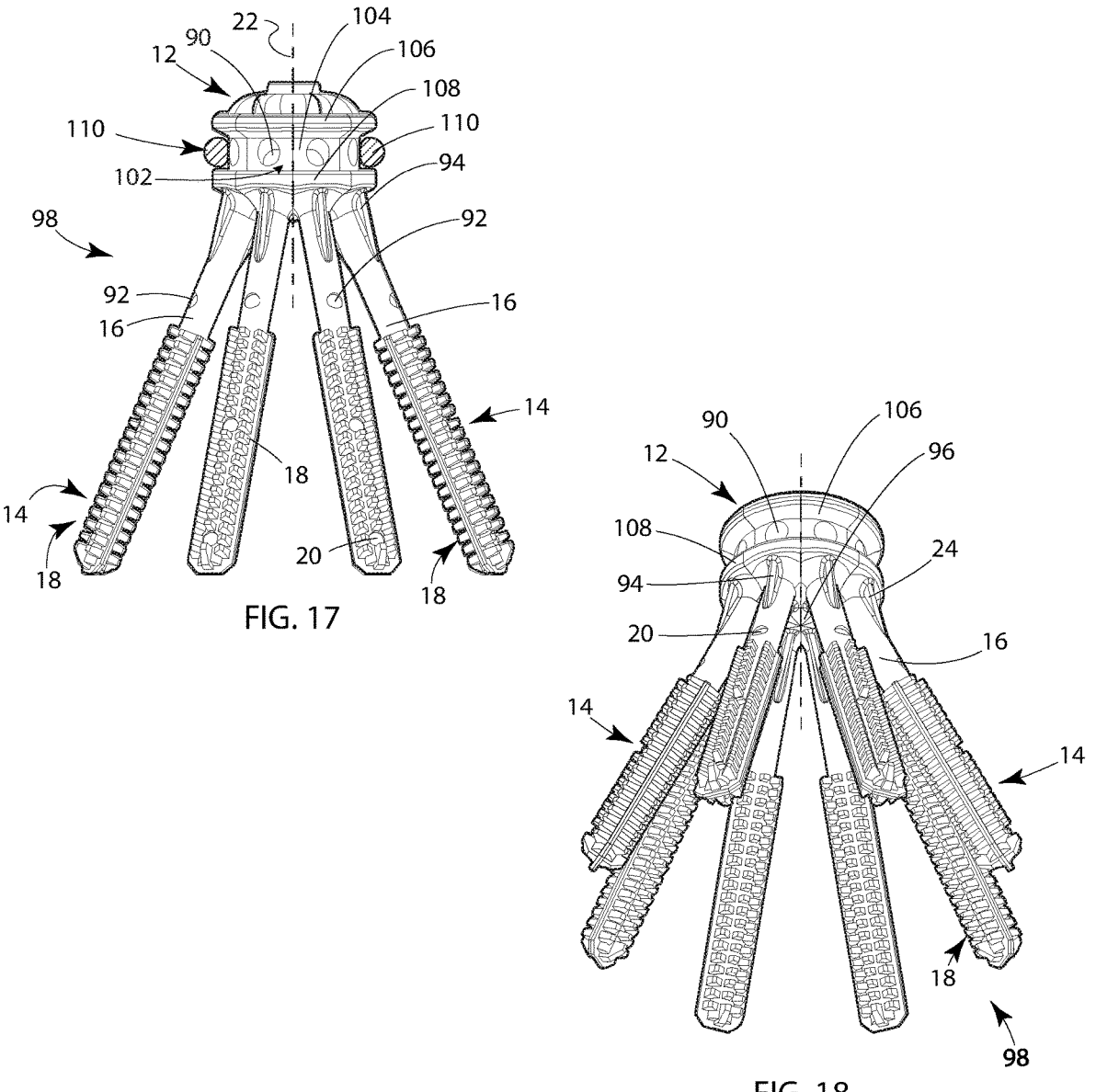
FIG. 17 is a side elevational view of a brush formed from the folding of the bristles of the brush precursor of FIG. 11.
FIG. 18 is a perspective view showing the interior of the Folded Brush of FIG. 17.
Figure 19:
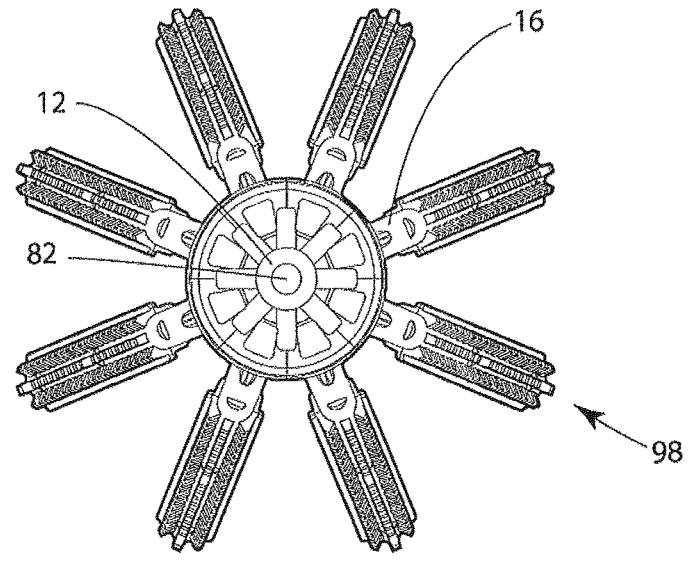
FIG. 19 is a top, plan view showing the exterior of the Folded Brush of FIG. 17.

The bristles of the brush precursor are folded inward from the first position to the second position to form a Folded Brush 98. Referring to FIGS. 17-18, a Folded Brush 98 is shown with the hub and bristles in the second position in which the bristles extend at an acute angle relative to the central axis 22 of the hub 12. As previously noted, in a preferred embodiment the hub is integrally molded with the bristles and the hub, and the bristles are moved from the first position to the second position by folding the bristles relative to the hub. More preferably, the hub has a planar, cylindrical shape. The bristles in the first position extend coplanar with the hub, and in the second position the bristles extend at an angle to the central axis of the hub not greater than 45°, and preferably 15° to 35°.

Figure 20:
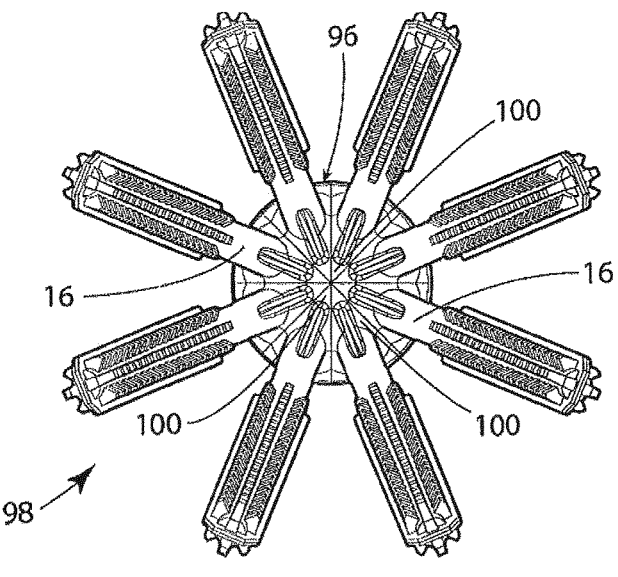
FIG. 20 is a bottom, plan view showing the interior of the Folded Brush of FIG. 17.

The brushes are easily formed by hand, or by mechanical means, by simultaneously pushing upwardly and inwardly on the interior side of the hub 12 while collectively rotating down the proximal ends of the bristles. The wedge-shaped gussets 96 are thereby brought together. As shown in FIG. 20, the wedge portions 100 of gussets 96 are configured to form a solid form when the bristles are fully in the second position. The wedge portions 100 include two angled mating faces 101 (FIG. 16) which help align, support and secure the bristles in a side-by-side arrangement upon fold-forming of the brush precursor into the squid shape. The angled faces 101 of the wedge portions 100 uniformly come together, as shown at the interior center of the Folded Brush 98 in FIGS. 18 and 20.

Locking Systems

The Folded Brushes may also include a system for locking the bristles in the second position relative to the hub. Such locking systems may be as simple as the use of an adhesive, sonic welding, or other means for directly securing the bristles together, for example by connecting wedge portions of adjacent gussets 96.

Alternatively, the bristles and/or the hub may include mechanical features that are used to secure the bristles in position. In such embodiments, separate locking members may secure the bristles together in the second position. For example, a locking collar may be applied surrounding the bristles and holding them in place. In one approach, at least one of the hub and the bristles defines a structure formed complementary to the locking member. As shown in the drawings, an exemplary complementary structure 26 may comprise an annular recess 102 defined by the hub and/or bristles. Referring to FIGS. 1 and 17, the brushes 10 and 98 are shown to have a locking structure 26 comprising an annular recess. In the Formed Brush 10, the annular recess is molded in as part of the hub, and the bristles extend therefrom. In FIG. 17, the Folded Brush 98 defines an annular recess 102 composed of aligned recesses in the bristles. Thus, referring to FIG. 11, each of the foldable bristles 14 of the brush precursor 80 includes a bristle recess 104 defined between a proximal shoulder 106 and a distal shoulder 108. Upon being folded, the bristle recesses 104 are aligned and form the complete annular recess 102.

Referring to FIG. 17, there is also shown a Folded Brush having a locking member 110 received in annular recess 102. The locking member in one form is a locking collar, which may be as simple as a ring-shaped member 112 received within the annular recess. The locking collar may be applied by assembling the collar about the brush, or the folded brush precursor can be pushed through the opening of the locking member, relying on the elasticity of the collar or of the brush to insert the brush.

In another aspect, the locking mechanism can be used to dictate the angles of the bristles in the second position. For example, the bristles of the Folded Brush may be angled based on the configuration of the locking mechanism. Considering the Folded Brush of FIG. 17, the use of a larger diameter locking collar would result in a greater bristle angle relative to the central axis of the hub. In this approach, the bristles would not have to be fully folded such that the wedge-shaped gussets contact each other.

It will be appreciated that various other mechanical configurations can operate in a similar manner. For example, the brush may instead include an annular ridge received in an annular recess of a locking mechanism. Further, other mechanical couplings providing a form fit, press fit, snap fit, or the like, can be adapted to lock the bristles in the second position.

Support Structures

The brushes may be used in a variety of ways and for a variety of purposes. For example, the Formed Brushes exemplified in FIG. 1 can be used without further modification. Similarly, a Folded Brush with the bristles locked in the second position, such as by a locking collar, are also useful in that condition. In the alternative, the brushes may be secured to a variety of support structures adapting the brushes to particular uses.

Figure 21:
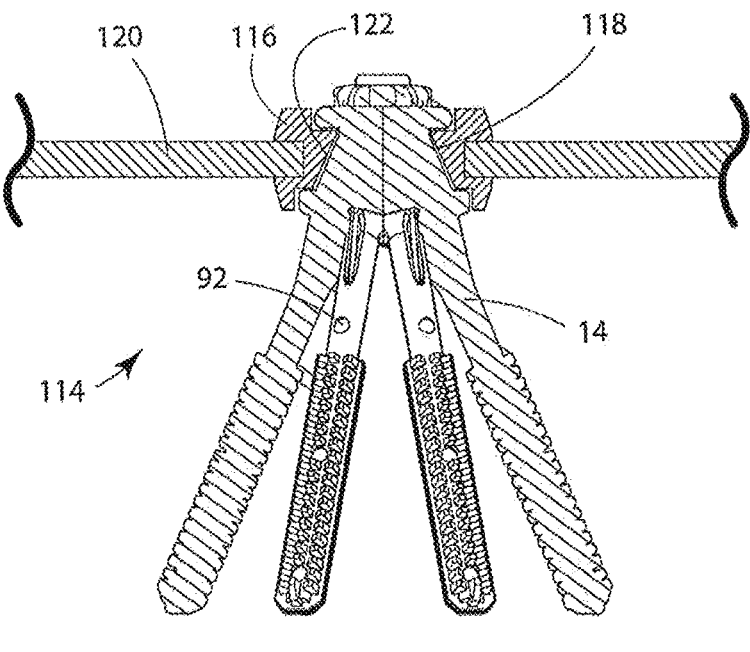
FIG. 21 is a side, partial cross-sectional view of a Folded Brush with the bristles locked in the second position by a locking collar, which is in turn received by a separate supporting structure, such as a stanchion.
Figure 22:
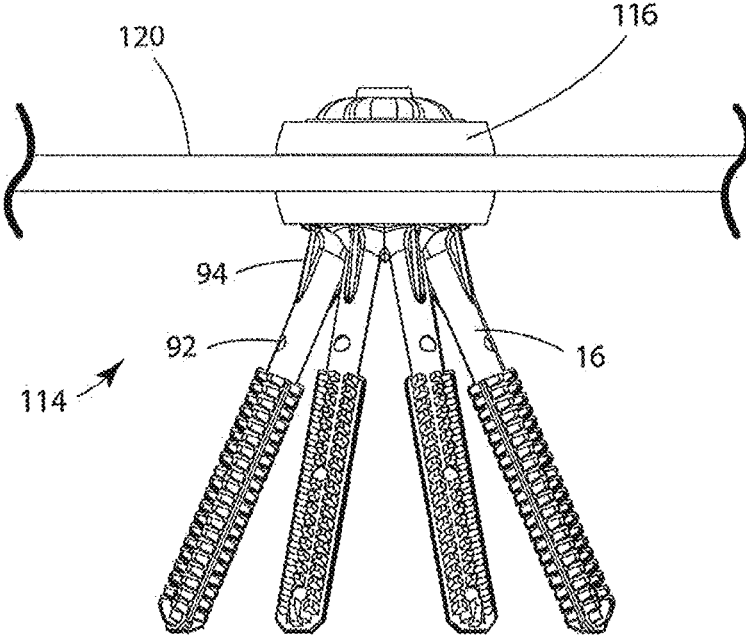
FIG. 22 is a side, elevational view of the Folded Brush, collar and support structure as shown in FIG. 21.

In embodiments, the locking structure is also used to secure the brush to a support structure. For example, FIG. 21 shows a brush 114 receiving a locking collar 116 within an annular recess 118. In this embodiment, the locking collar is used to lock the bristles in the second position, and also to secure the brush within a support structure 120. Also shown in FIG. 21 is an embodiment in which the locking collar includes a tapered surface 122 within an annular recess 118 which has a complementary shape. This embodiment further demonstrates the ability to control the angle of the bristles relative to the hub axis by using differing internal structures, e.g., tapers, of a locking member. FIG. 22 provides an elevational view of the brush and support structure of FIG. 21.

Figure 23:
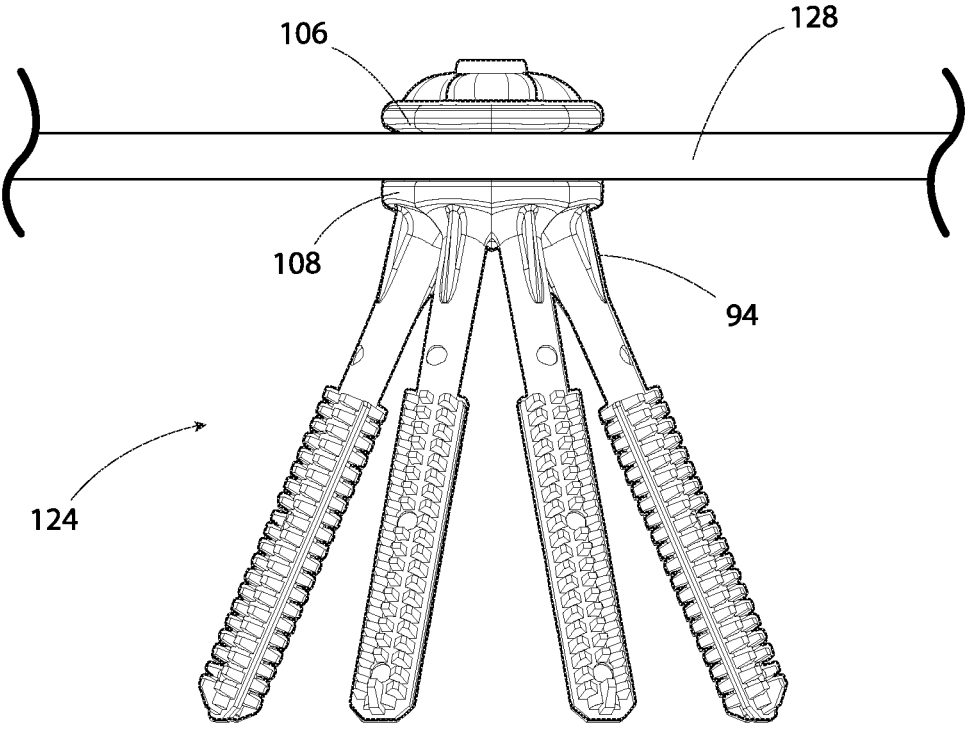
FIG. 23 is a side, elevational view of a Folded Brush having an annular recess received within an aperture in a support structure.
Figure 24:
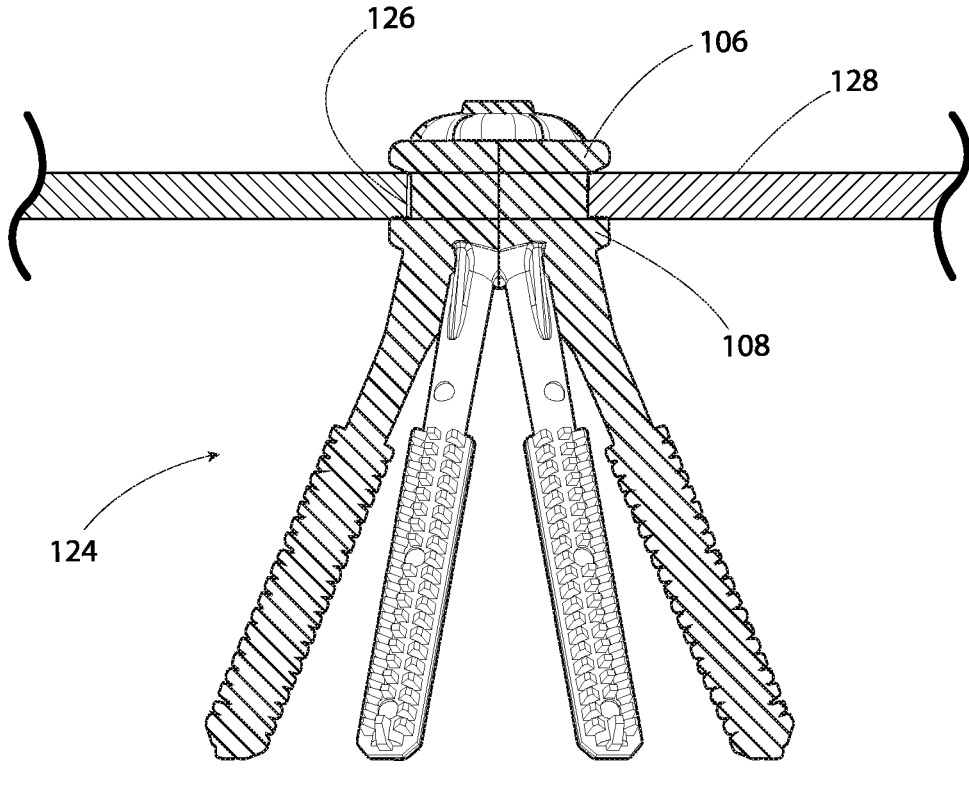
FIG. 24 is a partial, cross-sectional side view of the Folded Brush and support structure of FIG. 23.
Figure 25:
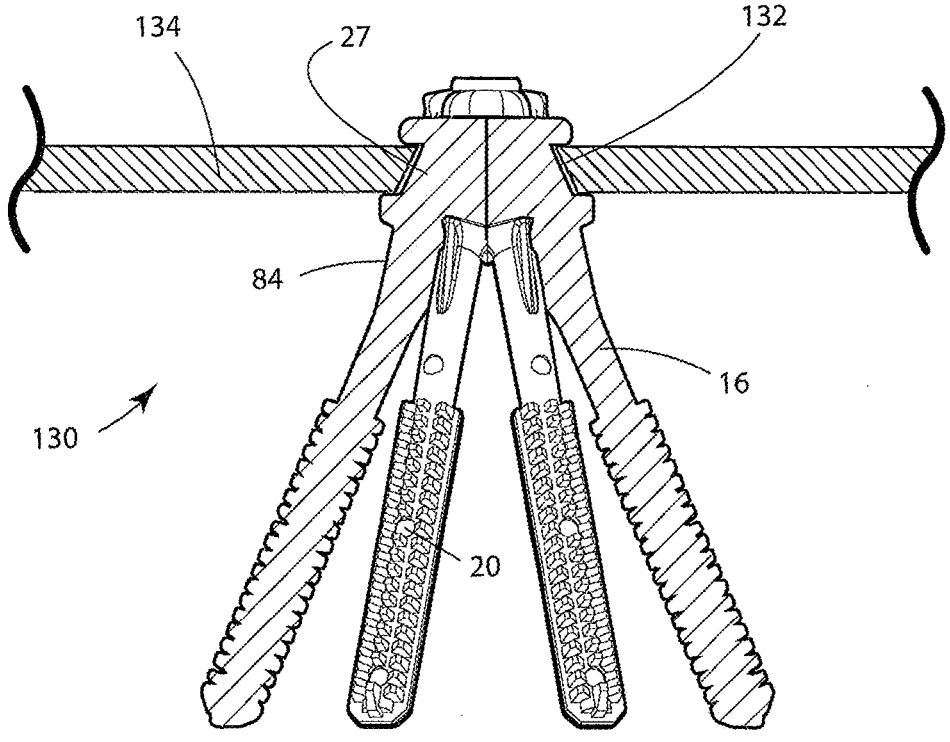
FIG. 25 is a partial, cross-sectional, side view of a Folded Brush secured to a support structure and including a tapered opening to control the angle of extension of the bristles from the hub.

In other embodiments, the folded brush may be directly inserted into a support structure which also functions as the locking mechanism. FIGS. 23-24 show a brush 124 received directly into an aperture 126 of support structure 128. The brush is form-folded and then inserted into the support structure. An additional advantage of the brush design is that it is readily inserted in either direction, either by first inserting the hub or first inserting the bristles into an aperture. In FIG. 25 there is shown a brush 130 including a tapered annular recess received in a complementary shaped aperture 132 in support structure 134. This also demonstrates that a support structure, rather than a locking mechanism, can be used to control the angle of the bristles.

Vehicle Washing

Figures 26, 27, 28:
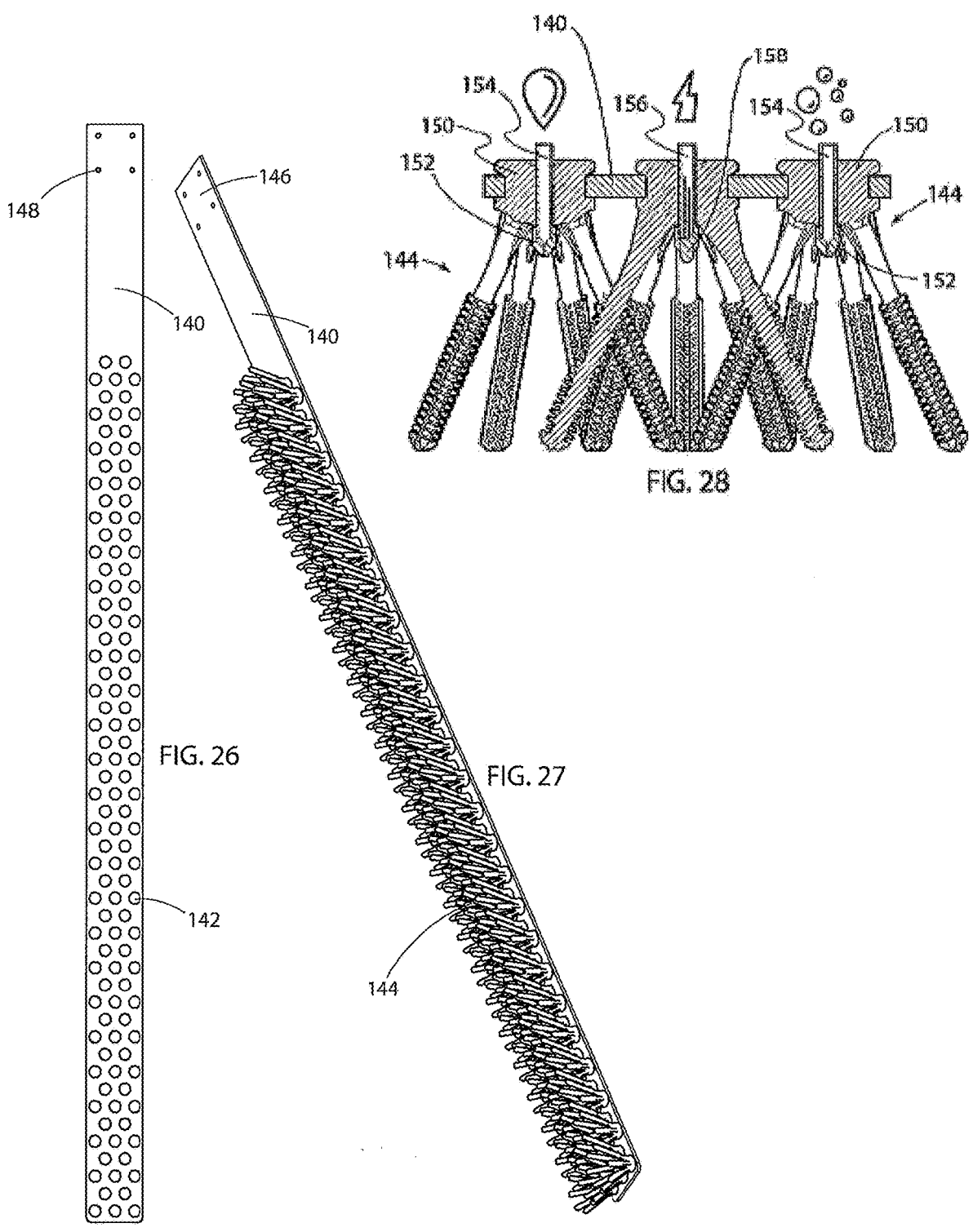
FIG. 26 is a front view of an exemplary embodiment of a linear type of stanchion with openings to receive brushes, and useful for example in a vehicle washing system.
FIG. 27 is a perspective view of the stanchion of FIG. 26 populated with brushes.
FIG. 28 is a partial, cross-sectional side view showing a stanchion containing brushes incorporating water and solution type nozzles, and LED lighting.

By way of example, a particular utility of the Squid Brushes is in the cleaning of vehicles. Shown in FIGS. 26-27 is the mounting of a combination of brushes in a stanchion to form a brushing apparatus for use in cleaning a vehicle or other subjects. The brushes in one aspect are carried on an elongated support structure and are arranged to be useful in washing a vehicle. The support structures preferably comprise vertically-suspended, elongated stanchions. The stanchions extend from a proximal end to a distal end, and suspended at the proximal end.

A preferred aspect is a brush apparatus comprising an array of brushes supported on a composite stanchion as shown in FIG. 26. Stanchion 140 includes an array of apertures 142 configured to receive and lock in place the brushes 144. Stanchion 140 includes an attachment end 146 provided with attachment means, e.g., apertures 148 to facilitate suspension of the stanchion and brushes in a vertical position. The stanchions comprise rigid or flexible substrates onto which the brushes are secured. The Squid brushes are securely fastened within the composited stanchion through their compression fitment within the annular recesses of the brushes defined by proximal shoulders 106 and distal shoulders 108. The stanchions may operate individually or as part of an overall system. In an embodiment, the stanchions are configured for use in washing the exterior of a vehicle.

The brushing apparatus may also provide additional components to enhance the utility of the SQUID™ Brushes. As shown in FIG. 28, brushes 144 include hubs 150 received in apertures in stanchion 140. FIG. 28 depicts the spacing of the brushes to provide for overlapping coverage of a surface to be cleaned. As the brushes are compressed against a surface, the bristles will spread in various directions, and will overlap with each other. Along with the movement of the stanchion, this provides a thorough and comprehensive contact between the brushes and the surface, thereby assuring a complete cleaning of the surface.

Also shown in FIG. 28 is the provision of auxiliary equipment useful in a vehicle washing system. Spray nozzles 152 communicate with tubing 154 and extend through central apertures 82 (FIG. 11) in brushes 144. Tubing 154 is connected with a fluid source and is operable to direct a fluid to the nozzles and out from the interior of the brush. This advantageously provides an application of a soap, rinsing solution, water, etc. at a position in close proximity to the surface being cleaned. Moreover, it dispenses the fluid in the midst of the brushes. As a result, a highly efficient and effective use of such fluids is accomplished.

In addition, other devices of interest may be positioned within or extending through the central apertures 82. By way of example, LED tubing 156 positions an LED light source 158 at the end of the central aperture. Such lighting allows for better visibility of the cleaning of the vehicle, and also can provide an interesting visual effect for persons in a vehicle being cleaned.

As known in the art, the cleaning effect of the brushing apparatus can be enhanced by having the stanchions, and therefore the brushes, move relative to the vehicle during cleaning. The type of relative movement between the stanchions and the vehicle can be varied, including up-and-down, translated, rotary, oscillating, etc. Also, the stanchion may be moved relative to a stationary vehicle, or the vehicle may be moved through a stationary vehicle washing system.

Example Vehicle Washing System

The structural and material makeup of the injection molded bristle brush can be flexibly formulated with many different specifications. By way of example, it has been found that an exemplary embodiment includes approximately eight (8) bristles with an overall length of approximately 3". The bristles have even or uneven lengths, a textured shaft diameter of approximately 0.250", and a length of approximately 1". In one embodiment, each bristle has approximately six rows, each row having approximately twenty nubs, and each nub having approximately eight cleaning edges for the remaining bristle length of approximately 2" and an overall outside diameter of approximately 0.375".

The annular recess of the brushes (upon being fold-formed into a Squid shape) has a cylindrical shape having an approximate inside diameter of 1.125" and outside proximal and distal shoulder diameters of approximately 1.375. The inside height dimension of the cylindrical shoulder is approximately 0.250".

After the brush assembly has been inserted into the stanchion's approximate 1" diameter hole and approximate 0.250 thickness, the annular recess experiences an approximate 0.065" compression throughout the shoulder area to secure its attachment to the stanchion.

Thus, in an embodiment, an aspect of the present invention is a multiple soft bristle brush assembly that is manufactured (e.g., injection molded) in a planar form which is then subsequently formed into a geometrical shape (resembling the profile of a squid). Each bristle may include a wedge-shaped, gusseted shaft with multiple projections (nubs) having cleaning edges circumferentially around the shaft. The brushes may be received in any type of support. In a particular embodiment, the brushes are mounted to a stanchion comprising an elongate material which may hold numerous brushes and which may be moved against a surface to be cleaned. The brushes preferably include a formed locking recess for simple insertion into the composited type stanchion. The stanchion contains multiple soft bristle brushes each having bristles with multiple cleaning type tips (nubs) throughout the profile of the bristles which provide continuous total brush cleaning regardless of how the bristles of the brush may deflect during the washing process.

Drum

Figures 29, 30:
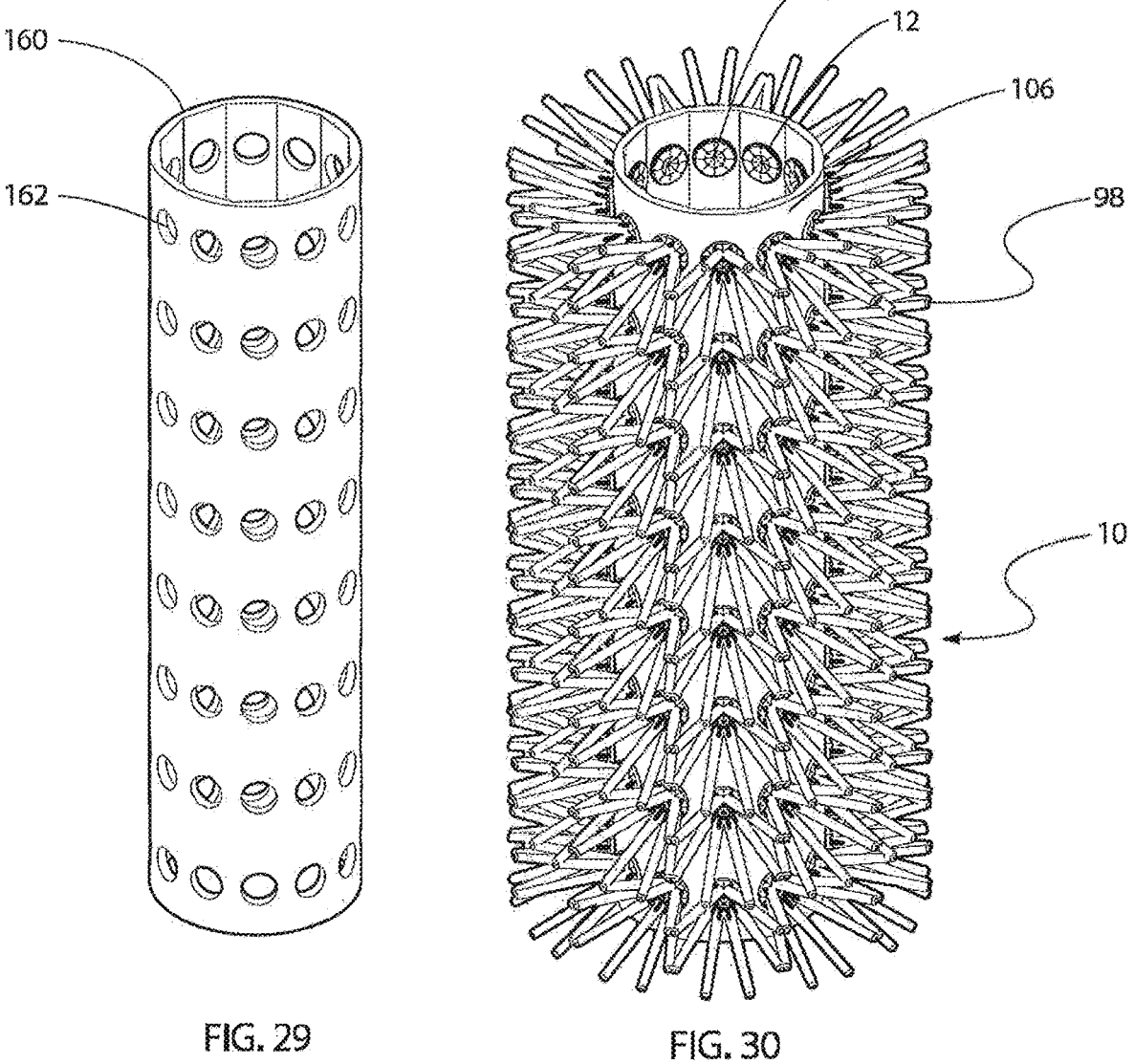
FIG. 29 is perspective view of a cylindrical stanchion with openings to receive brushes.
FIG. 30 is a perspective view of the cylindrical stanchion of FIG. 29 populated with brushes.

FIG. 29 shows a circular drum-type composited stanchion 160 with Squid Brush receiving apertures 162. FIG. 30 shows drum stanchion 160 populated with Squid Brushes 98. The drum stanchion can be used in conventional fashion by rotating the drum stanchion with the brushes in contact with a vehicle.

Hand Washer

Figure 31:
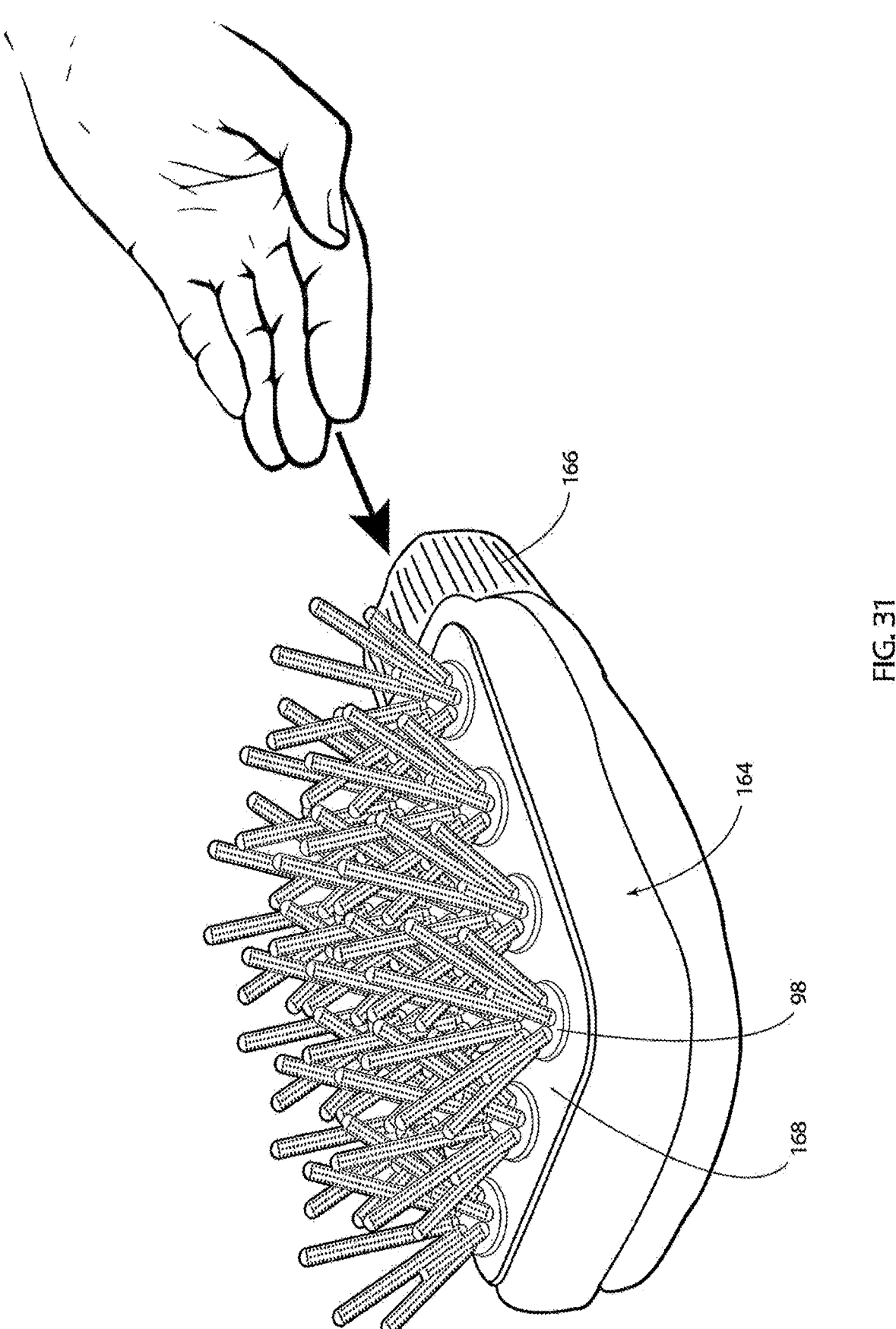
FIG. 31 is a perspective view of an exemplary embodiment of a support structure comprising a flexible washing mitt containing several brushes.

FIG. 31 shows a flexible fabric wash mitt 164 with a wrist cuff 166 having Squid brushes 98 attached to a very flexible composited support structure 168. The Squid structures and their attachments are very much the same as what has been previously described.

Dual Bristles

Figure 32:
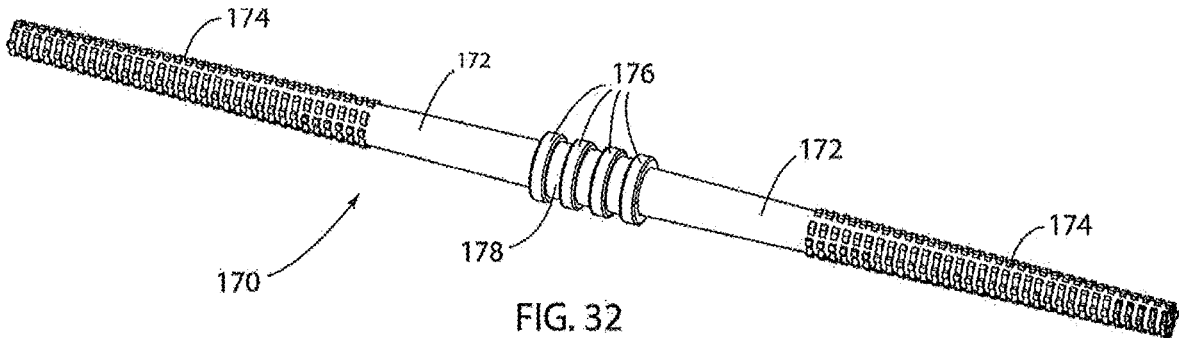
FIG. 32 is a perspective view of an injection-molded, double-ended bristle having multiple mounting positions in a support structure.
Figure 33:
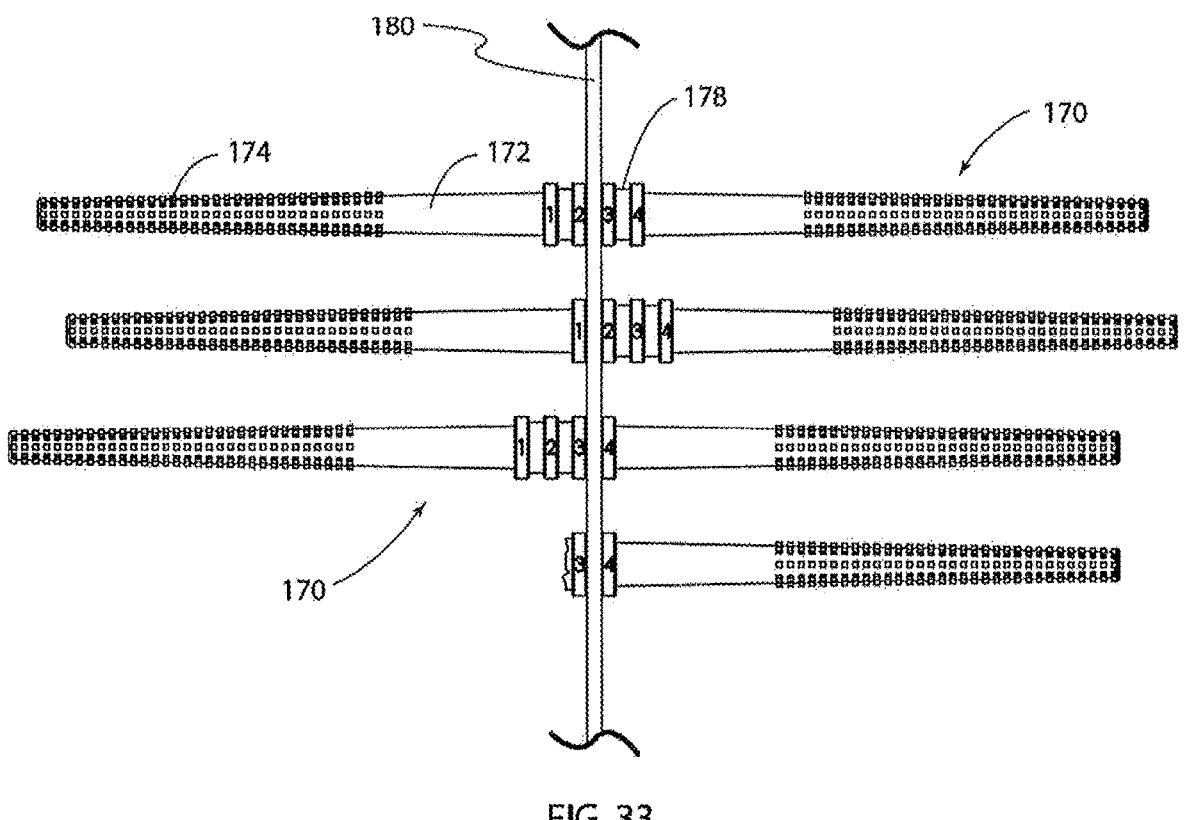
FIG. 33 is a side, elevational view of a linear stanchion showing the multiple mounting positions for the double-ended bristle of FIG. 32.

FIGS. 32-33 show injected molded single and dual bristle variations. These types of single or dual bristles have specific vehicle targeted cleaning purposes and are usually interposed with Squid bristles for targeting relatively small cleaning areas requiring a special type of vehicle washing bristle cleaning, e.g., white wall tires. The dual bristle 170 shown in FIG. 32 is formed in a longitudinal linear shape having two separate similar bristles with bristle shafts 172 and bristle nubs 174 connected in the middle by multiple rings 176 defining several annular recesses 178. The dual-bristle design allows for cleaning special vehicle exterior areas from both sides of a suspended composited support structure, e.g., the front of a moving (conveyorized) vehicle and its reverse in following the rear of the vehicle. Each separate recess 178 provides adjustment to lengthen or shorten the bristle's cleaning length as required. The use of two differently sized and shaped bristles within one molded unit, each bristle having the same or different protuberances, lengths, diameters, etc., allows for the unit to be located within a recess to provide two completely different types of bristles for two different types of required washing. FIG. 33 is a side view showing the different mounting positions for dual bristle 170 in a stanchion 180.

In embodiments, disclosed are vehicle washing devices and systems using the Squid Brushes. The devices comprise suspended linear composited stanchions which are fully populated with Squid brushes and which are generally non-rotating type. The articulating brushes achieve excellent high-resolution vehicle cleaning requiring significantly less water, chemical, and energy to operate.

The soft bristles of the Squid brushes with their circumferential cleaning edges have been shown to reach inwardly to totally clean even the toughest to reach areas of the vehicle—ledges, crevices, nooks and crannies often found with recessed windows, lights, door handles, mirrors, and grills. The washing process is extremely quiet in its operation, and almost totally eliminates the possible incidence of vehicle damage, because conventional brush rotation and required crush of the rotating brushes has been eliminated.

A vehicle washing brush apparatus and system in accordance with the present invention, provides soft bristle brushes which are self-fastening without the need for ancillary attachment parts; are light weight; are easy to assemble, install, replace, and service; and have purchase costs that are significantly reduced.

Miscellaneous Uses

Figure 34:
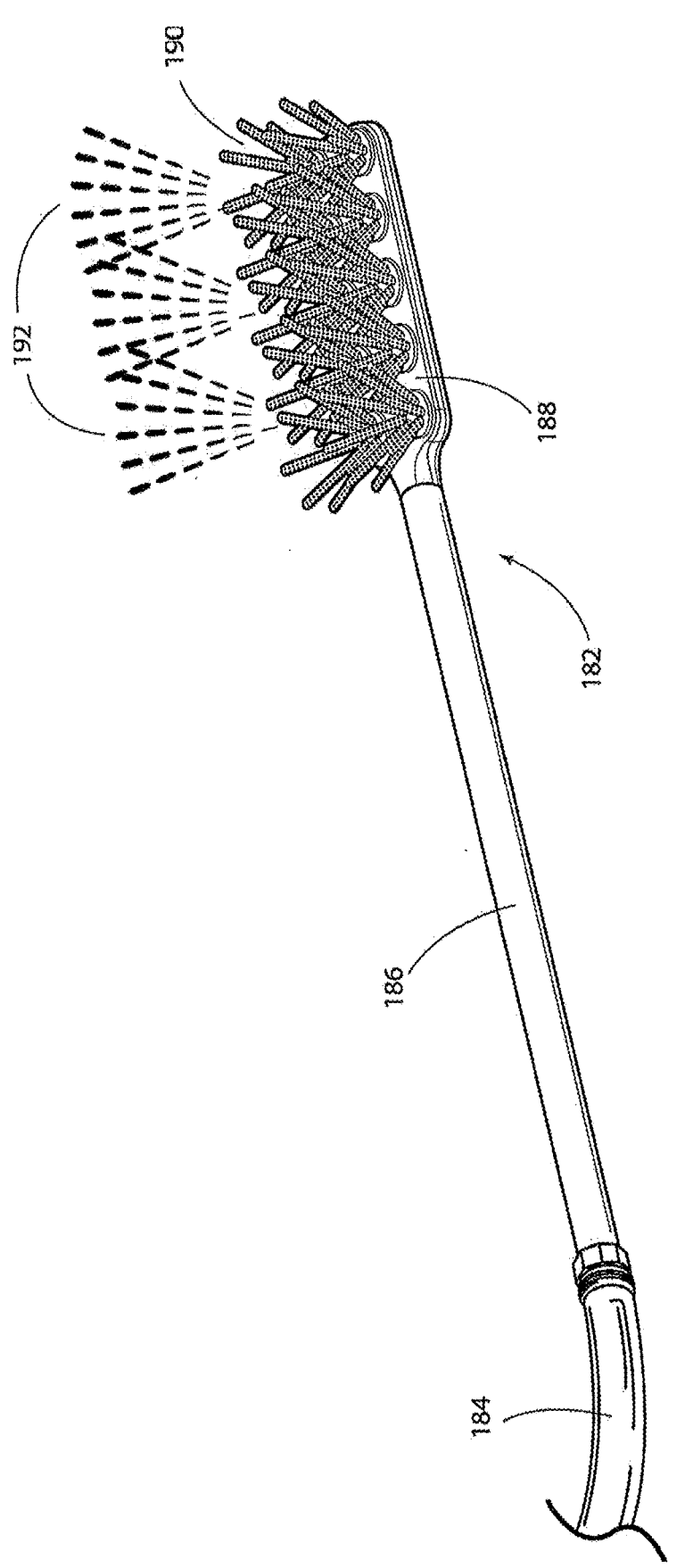
FIG. 34 is a perspective view of an exemplary embodiment of a support structure comprising a pole-extended type washing device holding a plurality of brushes.
Figure 35:
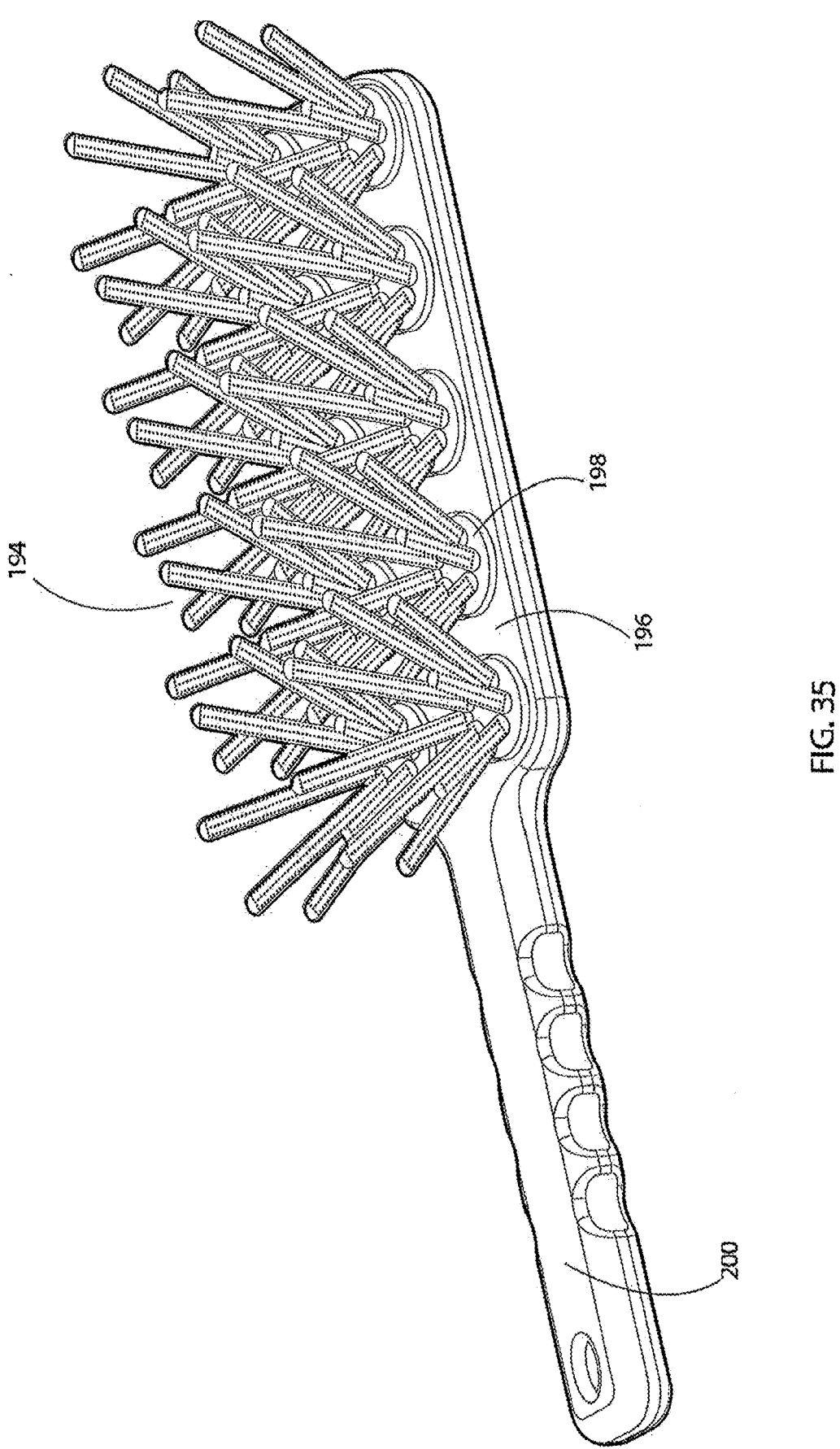
FIG. 35 is a perspective view of an exemplary embodiment of a support structure comprising a hand-held washing brush, such as used for cleaning a vehicle.

FIG. 34 shows a Squid pole brush 182 having a flexible water/solution line 184 and a rigid conduit 186 connected thereto. Fluid travels under pressure through rigid conduit 186 into a reservoir and support structure 188. Spraying of washing fluids through the Squid Brushes 190 is shown at 192, and may use nozzles as described with respect to FIG. 28. FIG. 35 shows a similar hand brush 194 comprising a support structure 196 carrying brushes 198, and including a handle 200.

Figure 36:
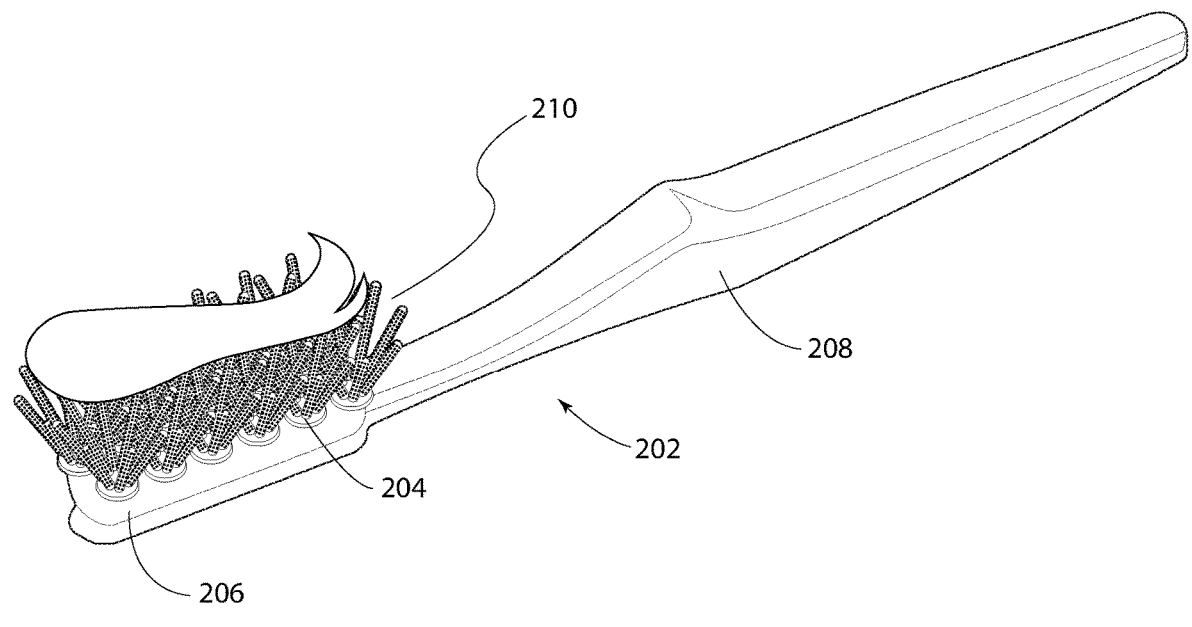
FIG. 36 is a perspective view of an exemplary embodiment of a support structure comprising a toothbrush containing a plurality of brushes.
Figure 37:
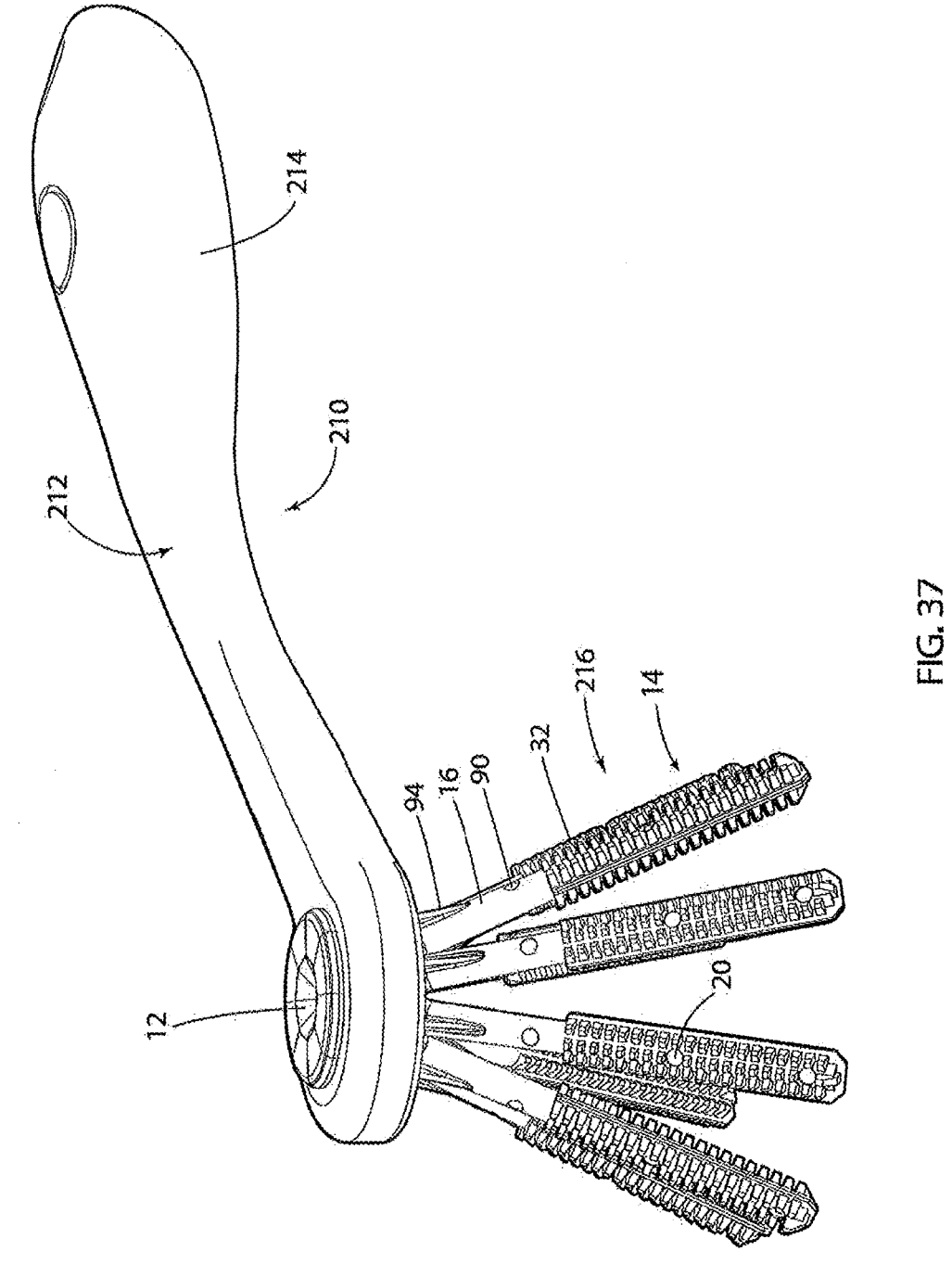
FIG. 37 is a perspective view of an exemplary embodiment of a support structure comprising a dishwashing type brush containing a plurality of brushes.

FIG. 36 shows a toothbrush 202 having brushes 204 mounted to a support structure 206 which is connected to a handle 208. FIG. 37 shows a dish washing brush 210 including a support structure 212 comprising a handle 214. Brush 216 is received within an aperture in the support structure. Mounting of the brushes to the support structures as shown in FIGS. 34-37 may be in the same manner as previously described and shown herein.

Disclosed is a suspended linear composited stanchion which is fully populated with brushes having a generally non-rotating type of car washing action. The articulating brushes achieve excellent high-resolution vehicle cleaning requiring significantly less water, chemicals, and energy to operate.

Figure 38:
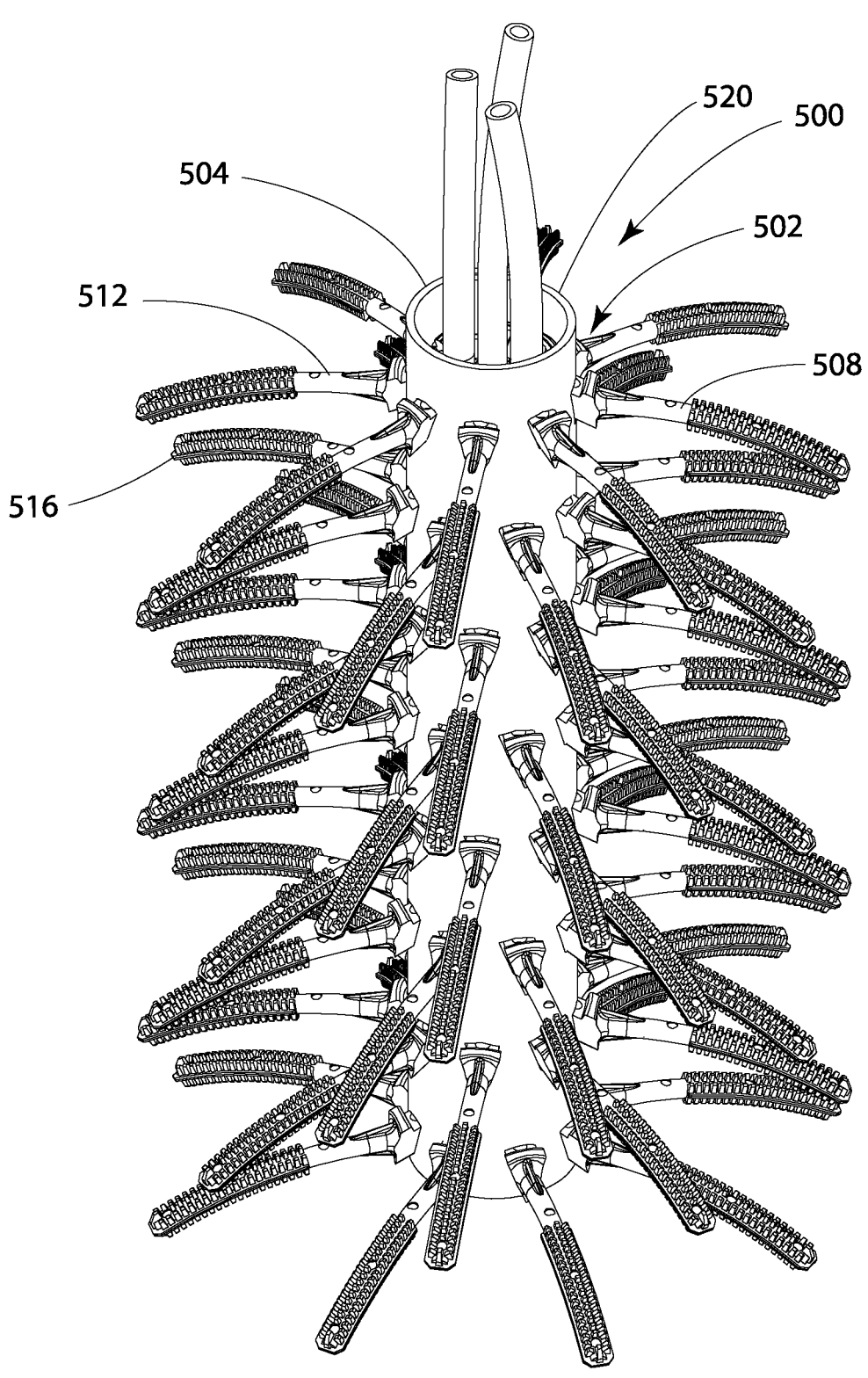
FIG. 38 is a perspective view of an alternate embodiment of the invention composing a brush component received in a cylindrical support.
Figure 39:
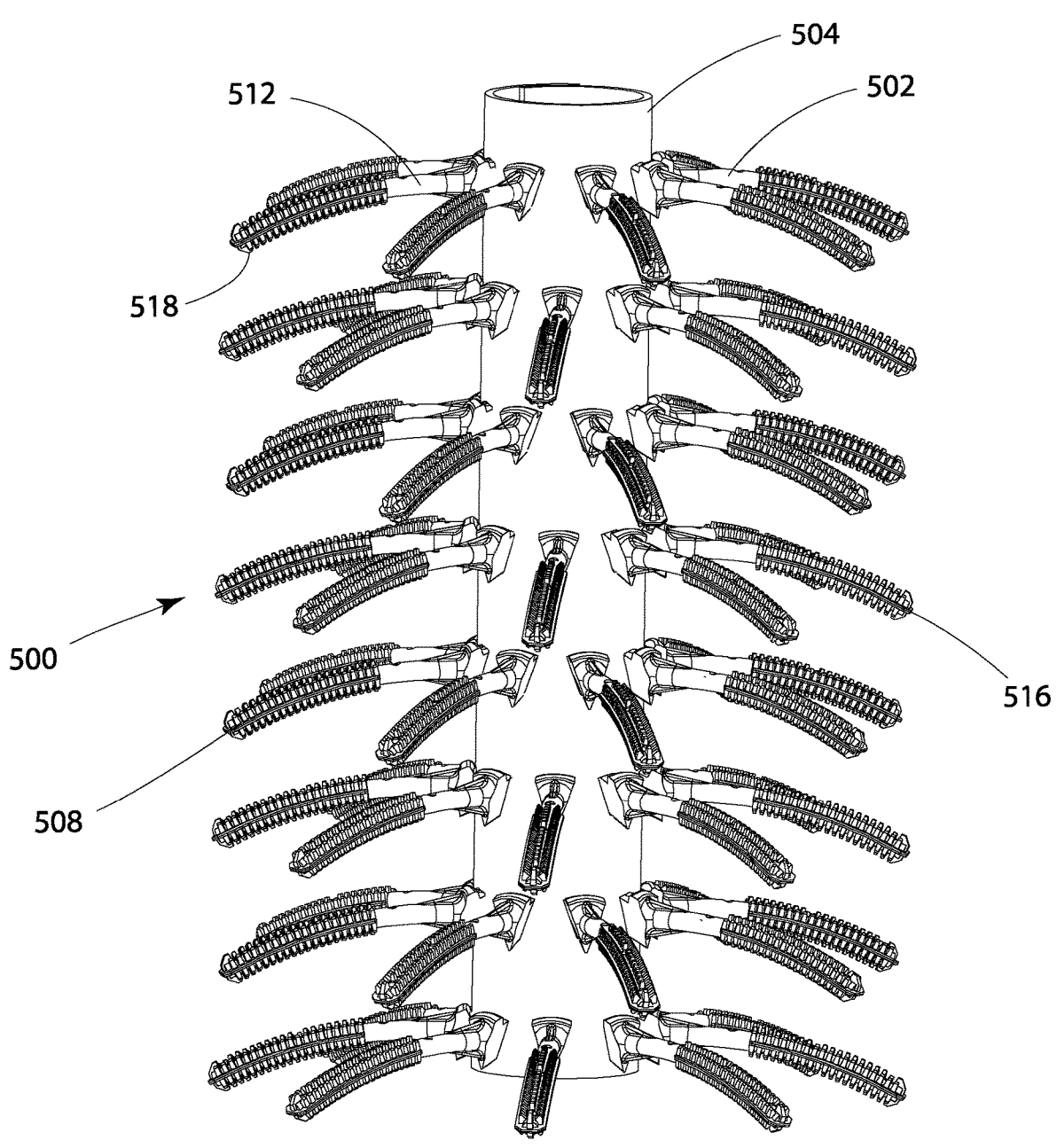
FIG. 39 is a side, elevational view of the embodiment of FIG. 38.
Figure 40:
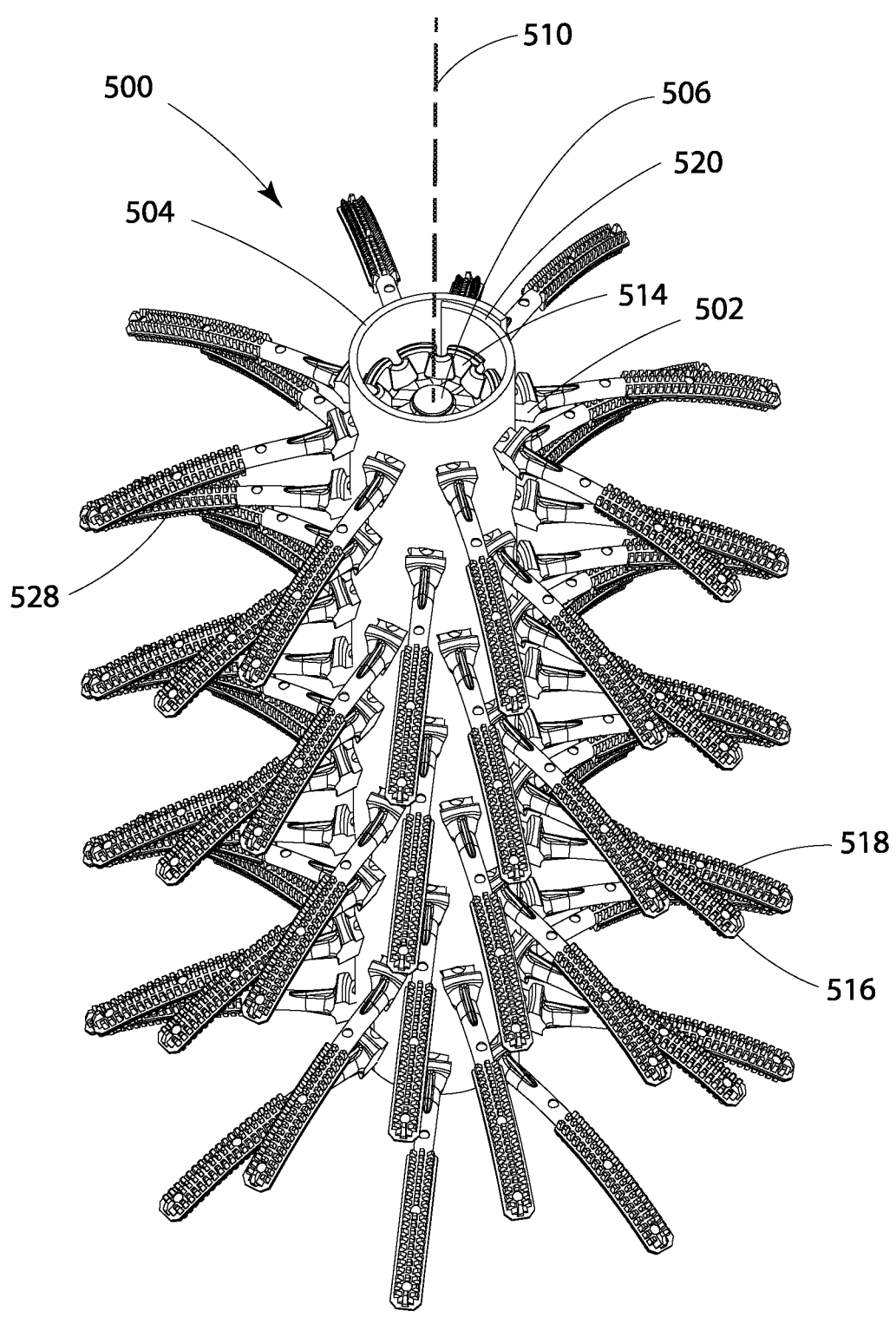
FIG. 40 is a close-up, partial perspective view of the top portion of the embodiment of FIG. 38.

Referring to FIG. 38, there is shown a perspective view of an alternate embodiment of the invention providing a vehicle washing device 500 comprising a brush component 502 and a cylindrical support 504. Brush component 502 comprises a hub 506 (FIG. 40) from which a plurality of bristles 508 extend.

It will be appreciated that brush component 502 may be the same as brush 10 previously described. In one aspect, brush component 502 is similar to a brush precursor 80 as already disclosed, such as shown in FIGS. 11, 16 and 17. In a particular aspect, brush component 502 is integrally formed. However, the brush components 502 may be comprised of various parts coupled together. The brush component may be formed in any manner, including integrally or not, to have the physical structures as set forth herein and in the appended claims.

Preferably, but not necessarily, hub 506 has a central axis 510 (FIG. 40), and the bristles extend radially from central axis 510. Each bristle includes an elongated shaft 512 extending from a proximal end 514 (FIG. 40) to a distal tip 516. Proximal end 514 is attached to hub 506. The elongated shafts include multiple cleaning structures extending outwardly from the shaft.

Cylindrical support 504 comprises a webbing 520 of material such as disclosed with respect to the stanchions previously described. Webbing 520 and brush components 502 are sufficiently flexible and resilient as to be able to wrap webbing 520 around brush components 502. The webbing is provided with spaced apertures 522 (FIG. 40) positioned to receive the bristles of the brush components.

As shown in the drawings, webbing 520 receives all of the bristles of the brush components and forms an elongated cylindrical support with the bristles extending radially outward.

In forming the vehicle washing device, the bristles are received within the spaced apertures 522 and thereby help to hold the shape of the cylindrical support. The webbing 520 is preferably selected to have a degree of flexibility to allow the wrapping to be performed. The apertures 522 may be sized to frictionally engage the bristles once the wrapping is completed. Additionally, the bristles may include locking structures as previously described in order to engage webbing 520. For example, the hub and or bristles may include a recess in which the webbing is received, also as previously described.

The cylindrical supports are depicted as being round, but it will be appreciated that this is not to be considered limiting. The cylindrical supports may have other cross-sectional shapes, with commensurate modifications being made to the shapes of the brush components, particularly the hub.

The brush component may be formed as having a hub having a planar configuration and in which the bristles are coplanar with the hub. In one embodiment, the cylindrical support is sized to wrap around the brush component such that the hub and bristles remain coplanar. In this embodiment, the bristles will extend from the cylindrical support in a plane that is orthogonal to the central axis of the hub.

Alternatively, the bristles may extend other than coplanar with the hub. The webbing may then be configured to receive brush components with the bristles extending other than orthogonal to the central axis. In embodiments, the bristles all extend in the same manner from the hub. In other embodiments, the bristles of a single brush component extend in varying directions and angles relative to the hub and the central axis.

The brush components may also be configured to have the bristles extend in a manner dictated by the sizing of the webbing. The cylindrical support may have a diameter such that the bristles of the brush component extend outwardly a predetermined angle relative to the central axis of the hub. For example, reducing the diameter of the webbing brings the spaced apertures closer together. For a foldable brush, this has the effect of folding the brush to some extent in order to receive the bristles. The smaller the diameter, the more the brush is folded. This in turn further changes the angle of the bristles to the central axis of the hub. Referring to FIG. 38, for example, reducing the diameter of cylindrical support 504, and therefore more closely spacing the apertures, results in an increased downward angle of the bristles relative to the central axis.

Alternatively, the angle of the bristles relative to the central axis can be controlled for a given diameter of cylinder based on the location of the locking structures of the hub and/or bristles.

The vehicle washing device may include any number of brush components. For each of the brush components, the bristles are received within and extend outwardly from respective apertures in webbing 520. These brush components may be spaced in any manner along the length of the cylindrical support.

The vehicle washing device 500 may include fluid tubing 524 extending along the cylindrical support. Fluid tubing 524 includes nozzles configured to spray a fluid against a vehicle being washed. In an embodiment, the nozzles comprise holes 525 formed in the fluid tubing. In another embodiment, the fluid tubing includes conventional spray nozzles (not shown) which are received in apertures in the cylindrical support. Fluid tubing 524 may be mounted on the outside of the cylindrical support, or preferably extends within the cylindrical support.

Figure 41:
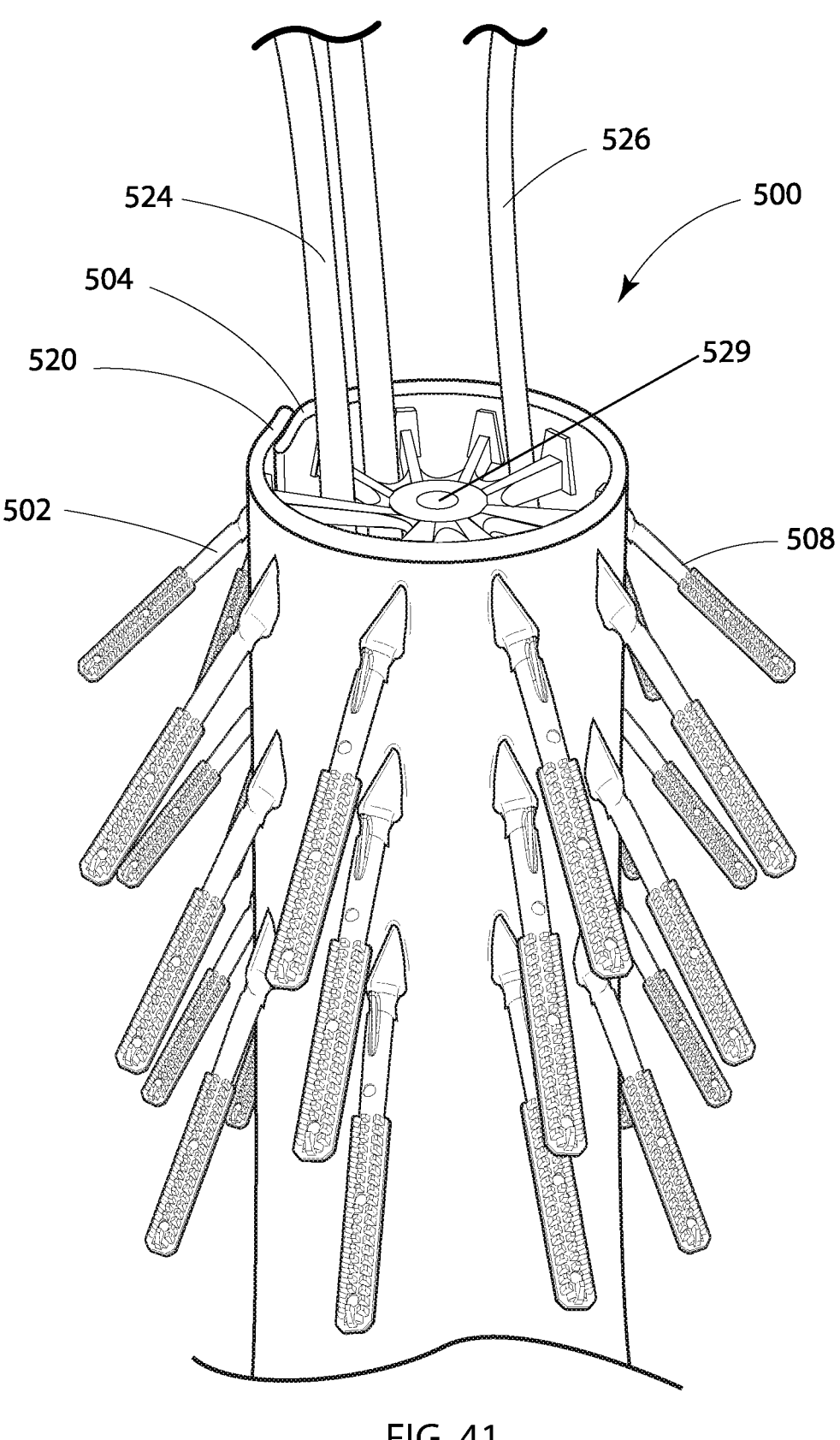
FIG. 41 is a top, plan view of the top portion of FIG. 38, further including light and fluid tubing.
Figure 42:
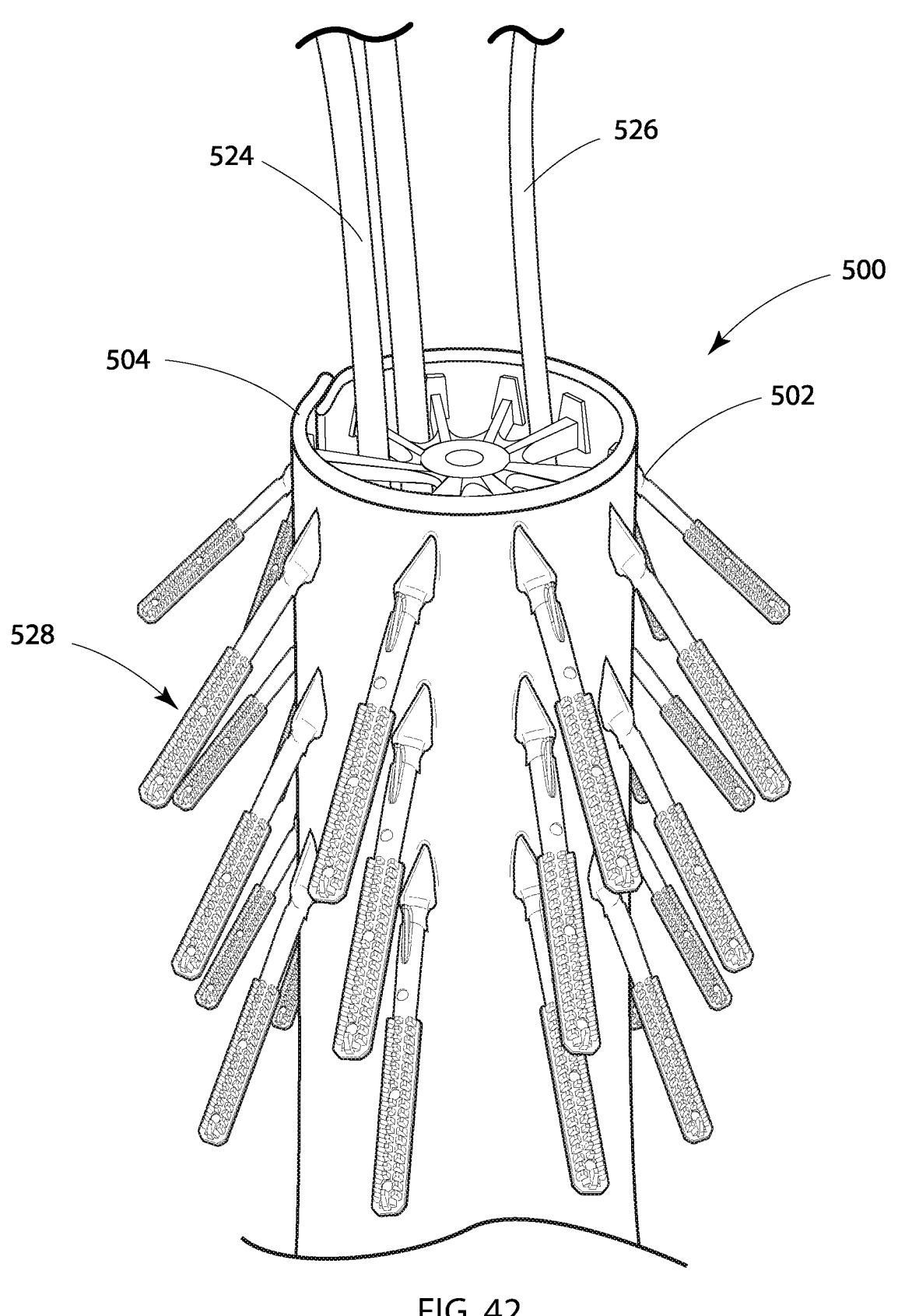
FIG. 42 is a close-up, partial perspective view of the top portion of the embodiment of FIG. 38.

The vehicle washing device 500 may also include light tubing 526 mounted on cylindrical support 504. In an embodiment, the light tubing contains LEDs 528. The light tubing 526 may extend along the outside of cylindrical support 504, or may extend within cylindrical support 504 if provided with pathways, such as apertures, for light to shine through the webbing. In an embodiment, the hubs 506 have a central hub aperture 529 (FIG. 41) for receiving fluid or light tubing.

A system for washing a vehicle may comprise a horizontal support surface and a vehicle washing device 500. The system includes a motion assembly configured to move the vehicle washing device in an up and down motion, including in an orbital motion. The vehicle washing device 500 is useful in a wide variety of known vehicle washing systems, including those previously described herein.

A method of preparing a vehicle washing device has been disclosed. The method comprises providing a brush component, preferably an integrally formed brush component, including a hub and a plurality of bristles. The hub has a central axis, and each bristle includes an elongated shaft extending from a proximal end to a distal tip. Each bristle has the proximal end attached to the hub, and each bristle has multiple cleaning structures extending outwardly from the shaft. The bristles extend radially from the hub in a direction, for example orthogonal, to the central axis of the hub. The method further comprises providing a cylindrical support comprising a flexible webbing including an array of holes positioned to receive the bristles of the brush component. Finally, the method includes wrapping the flexible webbing around the brush component with each of the bristles being received within and extending outwardly from respective holes in the webbing.

Figure 43:
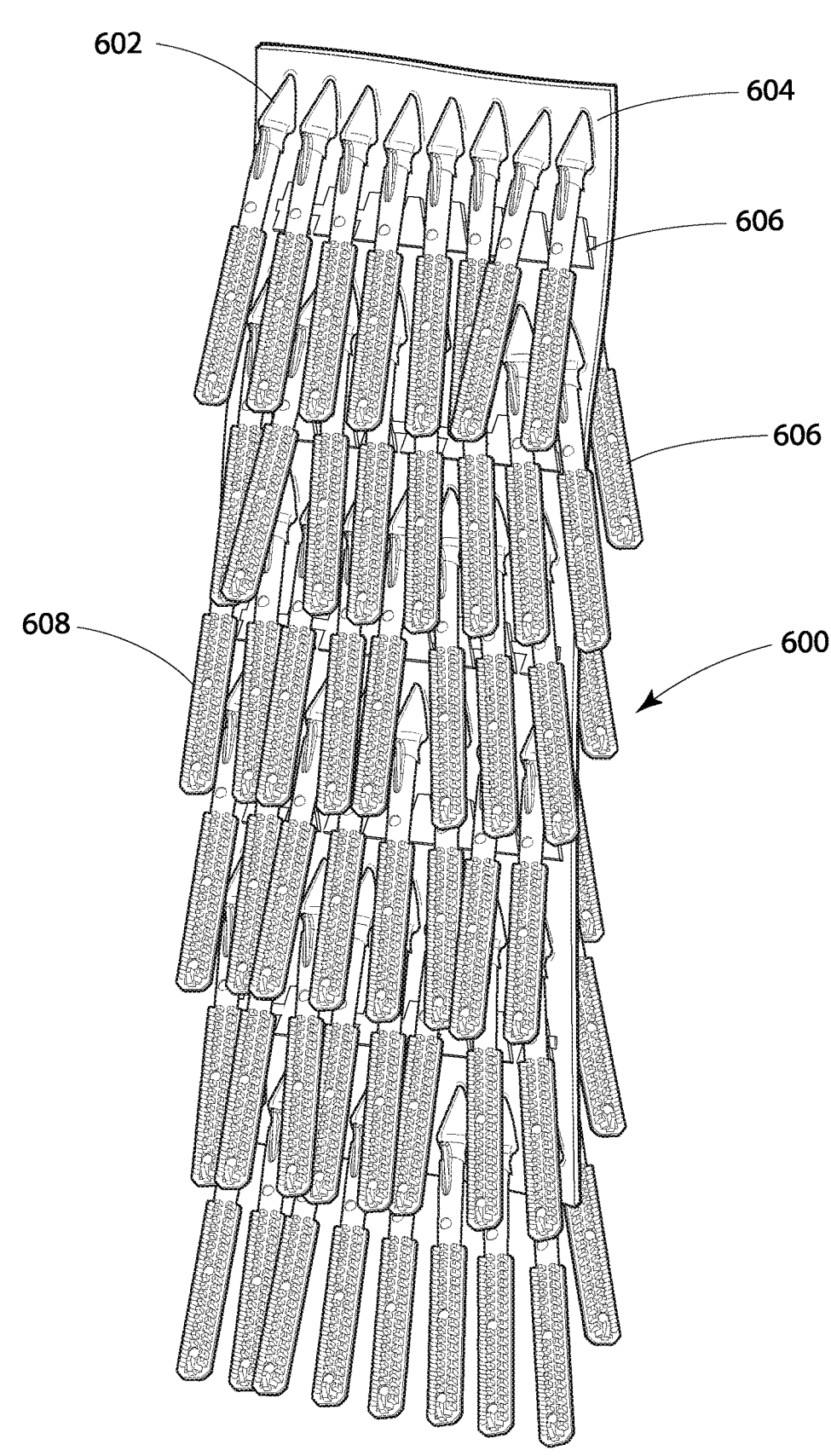
FIG. 43 is a front, elevational view of a further alternative embodiment of the invention, and particularly showing the brush shafts extending from both sides of a brush support.

Referring to FIG. 43, there is shown a linear brush embodiment 600 comprising a brush element 602 mounted to a flat stanchion 604. As shown in FIG. 43, the brush element comprises hub elements 606 which are secured together to form a unitary component including the hub elements 606 coupled with bristles 608. The brush element includes hub elements and/or bristles including locking structures, such as previously described, being engaged within spaced apertures in the flat stanchion. The brush element and the flat stanchion may be provided in accordance with methods and materials of prior embodiments. In one aspect, the brush element is molded in the linear form shown in FIG. 43. It will be appreciated, however, that brush element 602 could be formed in another manner and may comprise components coupled together. Linear brush embodiment 600 can also be rolled into a cylindrical form to provide a vehicle washing device 500.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected.

| Reference Number | |
|---|---|
| 10 | brush |
| 12 | hub |
| 14 | bristle |

-continued

| Reference Number | |
|---|---|
| 16 | shaft |
| 17 | proximal end |
| 18 | cleaning structures |
| 20 | through holes |
| 22 | central axis of hub 12 |
| 24 | gussets |
| 26 | locking structure |
| 28 | central axis of shaft 16 |
| 30 | end portion/tip |
| 32 | nub |
| 34 | side wall of a nub 32 |
| 36 | end surface of a nub 32 |
| 38 | corner edge of nub 32 |
| 40 | wiper blade |
| 42 | side wall of blade 40 |
| 44 | contact surface of blade 40 |
| 46 | rounded nubs |
| 48 | cup-shaped nubs |
| 50 | needle-type nubs |
| 52 | wafer type nubs |
| 54 | pad-type nubs |
| 56 | corkscrew nubs |
| 60 | brush |
| 62 | tree branches |
| 64 | coarse comb |
| 66 | forked wiper blade |
| 68 | tapered branches |
| 70 | dense comb |
| 72 | fine tapered fins |
| 74 | coarse tapered fins |
| 76 | radius |
| 80 | brush precursor |
| 82 | hub central aperture |
| 84 | proximal end of 16 |
| 86 | connectors |
| 87 | open spaces |
| 88 | webbing |
| 90 | ejection pin locations (inner) |
| 92 | ejection pin locations (outer) |
| 94 | braces |
| 96 | wedge-shaped gussets |
| 98 | folded brush |
| 100 | wedge portions |
| 101 | gusset mating faces |
| 102 | annular recess (FIG. 17) |
| 104 | bristle recess |
| 106 | proximal shoulder |
| 108 | distal shoulder |
| 110 | locking member |
| 112 | annular ring |
| 114 | brush - FIG. 21 |
| 116 | locking collar - FIG. 21 |
| 118 | annular recess - FIG. 21 |
| 120 | support structure - FIG. 21 |
| 122 | tapered surface - FIG. 21 |
| 124 | brush - FIGS. 23-24 |
| 126 | aperture - FIGS. 23-24 |
| 128 | support structure - FIGS. 23-24 |
| 130 | brush - FIG. 25 |
| 132 | aperture - FIG. 25 |
| 134 | support structure |
| 140 | stanchion (FIG. 26) |
| 142 | apertures (FIG. 26) |
| 144 | brushes |
| 146 | attachment end |
| 148 | attachment means |
| 150 | hubs |
| 152 | spray nozzles |
| 154 | tubing |
| 156 | LED tubing |
| 158 | LED light source |
| 160 | drum stanchion |
| 162 | apertures |
| 164 | washing mitt |
| 166 | wrist cuff |
| 168 | support structure |
| 170 | dual bristle |

-continued

-continued

| Reference Number | |
|---|---|
| 172 | dual bristle shafts |
| 174 | bristle nubs |
| 176 | rings |
| 178 | annular recesses |
| 180 | stanchion |
| 182 | pole brush |
| 184 | water line |
| 186 | rigid conduit |
| 188 | support structure |
| 190 | brushes |
| 192 | spraying |
| 194 | hand brush |
| 196 | support structure |
| 198 | brushes |
| 200 | handle |
| 202 | toothbrush |
| 204 | brushes |
| 206 | support structure |
| 208 | handle |
| 210 | dishwashing brush |
| 212 | support structure |
| 214 | handle |
| 216 | brush |
| 218 | nesting brush |
| 220 | bristle |
| 222 | stem |
| 300 | center component |
| 302 | support structure |
| 304 | sides |
| 306 | top support |
| 308 | brushing units |
| 310 | brush support |
| 312 | brushes |
| 314 | stanchion |
| 316 | outer stanchion |
| 318 | outer stanchion |
| 320 | center stanchion |
| 322 | lateral arm |
| 324 | stanchion |
| 326 | stanchion |
| 328 | lateral arm |
| 330 | slider |
| 332 | slider |
| 334 | slider |
| 336 | bottom curved portion |
| 338 | second curved portion |
| 340 | tubes |
| 342 | lights |
| 344 | nozzles |
| 346 | crankshaft component |
| 348 | crank arms |
| 350 | between crank arms |
| 354 | stanchion support |
| 356 | bolts |
| 358 | collar |
| 364 | supporting strap |
| 366 | support lines |
| 368 | end of crankshaft component |
| 370 | end strut |
| 400 | articulating system |
| 402 | external support |
| 404 | top structure |
| 406 | horizontal arm |
| 408 | vertical pin |
| 410 | second vertical pin |
| 500 | vehicle washing device |
| 502 | brush component |
| 504 | cylindrical support |
| 506 | hub |
| 508 | bristle |

| Reference Number | |
|---|---|
| 510 | central axis |
| 512 | elongated shaft |
| 514 | proximal end |
| 516 | distal tip |
| 518 | multiple cleaning structures |
| 520 | webbing |
| 522 | spaced apertures |
| 524 | fluid tubing |
| 525 | nozzle holes |
| 526 | light tubing |
| 528 | LEDs |
| 529 | hub aperature |
| 600 | linear brush component |
| 602 | brush element |
| 604 | flat stanchion |
| 606 | hub element |
| 608 | bristle |

What is claimed is:

1. A vehicle washing device comprising:
a brush component including a hub and a plurality of bristles, the hub having a central axis, each bristle including an elongated shaft extending from a proximal end to a distal tip, each bristle having the proximal end attached to the hub, each bristle having multiple cleaning structures extending outwardly from the shaft, the bristles extending radially from the central axis of the hub; and
a cylindrical support comprising a webbing comprising an array of holes positioned to receive the bristles of the brush component, each of the bristles being received within and extending outwardly from respective holes in the webbing;
further including tubing extending along the cylindrical support, the tubing including nozzles configured to spray a fluid against a vehicle being washed.

2. The vehicle washing device of claim 1 in which the nozzles comprise holes formed in the tubing.

3. The vehicle washing device of claim 1 in which the nozzles are received in apertures in the cylindrical support.

4. The vehicle washing device of claim 1 in which the tubing including nozzles extends within the cylindrical support.

5. The vehicle washing device of claim 1 in which the tubing is mounted on the outside of the cylindrical support.

6. The vehicle washing device of claim 1 in which the light tubing contains LEDs.

7. The vehicle washing device of 6 in which the light tubing extends within the cylindrical support.

8. The system of claim 6 in which the support system includes a motion assembly configured to move the at least one vehicle washing device in an up and down motion.

9. The system of claim 7 in which the at least one vehicle washing device is moved in an orbital motion.

10. A system for washing a vehicle comprising:
a horizontal support system; and
at least one vehicle washing device according to claim 1 mounted to the support system and hanging downwardly therefrom.

* * * * *